US006633675B1

(12) United States Patent
Abe

(10) Patent No.: US 6,633,675 B1
(45) Date of Patent: Oct. 14, 2003

(54) METHOD AND APPARATUS FOR COMPRESSING AND EXPANDING IMAGE DATA

(75) Inventor: Nobuaki Abe, Hokkaido (JP)

(73) Assignee: Pentax Corporation, Tokyo (JP)

( * ) Notice: Subject to any disclaimer, the term of this patent is extended or adjusted under 35 U.S.C. 154(b) by 485 days.

(21) Appl. No.: 09/642,814

(22) Filed: Aug. 22, 2000

(30) Foreign Application Priority Data

Aug. 23, 1999 (JP) .......................................... P11-235955

(51) Int. Cl.⁷ ............................ G06K 9/36; G06K 9/38; G06K 9/46
(52) U.S. Cl. ....................... 382/232; 382/233; 382/252; 382/253; 382/239
(58) Field of Search ................................. 382/184, 239, 382/232, 233, 287, 295, 296, 297, 298, 299, 300; 345/648, 659, 660, 671, 672, 677; 348/449, 561, 581, 583, 704; 358/428, 451, 488, 525; 708/203, 208, 290

(56) References Cited

U.S. PATENT DOCUMENTS

| | | | | |
|---|---|---|---|---|
| 4,952,923 A | * | 8/1990 | Tamura | 345/671 |
| 5,159,648 A | * | 10/1992 | Ogura et al. | 382/298 |
| 5,572,605 A | * | 11/1996 | Toraichi | 382/241 |
| 5,737,456 A | * | 4/1998 | Carrington et al. | 382/299 |
| 6,104,841 A | * | 8/2000 | Tojo et al. | 382/299 |
| 6,285,398 B1 | * | 9/2001 | Shinsky et al. | 348/223.1 |
| 6,473,558 B1 | * | 10/2002 | Wu et al. | 386/68 |

FOREIGN PATENT DOCUMENTS

WO 99/64987 12/1999

OTHER PUBLICATIONS

Kazuo Toraichi, "Wavelets, Fractals, and Chaos from Fluency Analysis", Suri–Kagaku No. 363, pp. 8–12.

Kazuo Toraichi, "Wisdom Systems Based on Fluency Analysis", Toyota Research Report No. 48, pp. 39–45 (May, 1995).

Kazuo Toraichi et al., "A General Formula for the Wavelets in Fluency Approach", IEICE Trans. Fundamentals, vol. E77–A, No. 5, pp. 818–824 (May 1994).

Kazuo Toraichi et al., "A Series of Discrete–Time Models of a Continuous–Time System Based on Fluency Signal Approximation", Int. J. Systems Sci., vol. 26, No. 4, pp. 871–881 (1995).

K. Toraichi et al., "A Series of Discrete–Time Models of a Continuous–Time System Based on Fluency Signal Approximation", IEEE Pac. Rim, pp. 493–496 (1993).

An English Translation of WO99/64987.

* cited by examiner

*Primary Examiner*—Andrew W. Johns
*Assistant Examiner*—Amir Alavi
(74) *Attorney, Agent, or Firm*—Greenblum & Bernstein, P.L.C.

(57) ABSTRACT

A compression apparatus transforms original image data partitioned into first blocks, each of which is composed of a plurality of pixels, to reduced-image data composed of a smaller number of pixels than that of the original image data. The reduced-image data is subjected to a fluency transform to generate expanded-image data partitioned into second blocks corresponding to the first blocks. The fluency transform has a plurality of modes, and one mode is selected from the plurality of modes, thus the expanded-image data is generated in accordance with the selected one mode. An error, which represents a difference between the original image data and the expanded-image data, is calculated in each of the plurality of modes. Then, an optimum mode, by which the error becomes a minimum value, is determined among the plurality of modes. On the other hand, an expansion apparatus generates the expanded-image data by applying the fluency transform using the optimum mode.

19 Claims, 17 Drawing Sheets

| PIXEL VALUES \ m | 1 | 2 | 3 |
|---|---|---|---|
| 10 | $R_{ts}$ | $(9R_{ts}+7R_{ts-1})/16$ | $(681R_{ts}+469R_{ts-1}-77R_{ts+1}-49R_{ts-2})/1024$ |
| 11 | $R_{ts}$ | $(11R_{ts}+5R_{ts-1})/16$ | $(849R_{ts}+285R_{ts-1}-85R_{ts+1}-25R_{ts-2})/1024$ |
| 12 | $R_{ts}$ | $(13R_{ts}+3R_{ts-1})/16$ | $(961R_{ts}+141R_{ts-1}-69R_{ts+1}-9R_{ts-2})/1024$ |
| 13 | $R_{ts}$ | $(15R_{ts}+R_{ts-1})/16$ | $(1017R_{ts}+37R_{ts-1}-29R_{ts+1}-R_{ts-2})/1024$ |
| 14 | $R_{ts}$ | $(15R_{ts}+R_{ts+1})/16$ | $(1017R_{ts}-29R_{ts-1}+37R_{ts+1}-R_{ts+2})/1024$ |
| 15 | $R_{ts}$ | $(13R_{ts}+3R_{ts+1})/16$ | $(961R_{ts}-69R_{ts-1}+141R_{ts+1}-9R_{ts+2})/1024$ |
| 16 | $R_{ts}$ | $(11R_{ts}+5R_{ts+1})/16$ | $(849R_{ts}-85R_{ts-1}+285R_{ts+1}-25R_{ts+2})/1024$ |
| 17 | $R_{ts}$ | $(9R_{ts}+7R_{ts+1})/16$ | $(681R_{ts}-77R_{ts-1}+469R_{ts+1}-49R_{ts+2})/1024$ |

FIG. 11

| $I'_{x7}$ \ m | 1 | 2 | 3 |
|---|---|---|---|
| | | | T2 |
| $I'_{07}$ | I7 | (9I7+7g7)/16 | (681I7+469g7−77h7−49f7)/1024 |
| $I'_{17}$ | I7 | (11I7+5g7)/16 | (849I7+285g7−85h7−25f7)/1024 |
| $I'_{27}$ | I7 | (13I7+3g7)/16 | (961I7+141g7−69h7−9f7)/1024 |
| $I'_{37}$ | I7 | (15I7+g7)/16 | (1017I7+37g7−29h7−f7)/1024 |
| $I'_{47}$ | I7 | (15I7+h7)/16 | (1017I7−29g7+37h7−k7)/1024 |
| $I'_{57}$ | I7 | (13I7+3h7)/16 | (961I7−69g7+141h7−9k7)/1024 |
| $I'_{67}$ | I7 | (11I7+5h7)/16 | (849I7−85g7+285h7−25k7)/1024 |
| $I'_{77}$ | I7 | (9I7+7h7)/16 | (681I7−77g7+469h7−49k7)/1024 |

METHOD AND APPARATUS FOR COMPRESSING AND EXPANDING IMAGE DATA

BACKGROUND OF THE INVENTION

1. Field of the Invention

This invention relates to a method and apparatus for compressing and expanding digital image data, especially, relates to image compression by reducing the number of pixels of original image data, and image expansion by increasing the number of pixels of reduced-image data.

2. Description of the Related Art

In an example of an image compression method, it has been known to calculate the average value of a predetermined number of pixels. In this compression method, applied to original digital image data, which is partitioned into pixel-blocks composed of a plurality of pixels, an average pixel value for the plurality of pixels is calculated in each block. Consequently, reduced-image data composed of pixels having the average pixel values is obtained. When expanding the reduced-image data to restore the original image, an interpolation processing, such as a linear interpolation, is usually performed so that expanded-image data corresponding to the original image data is obtained.

However, since part of the information included in the original image data is lost in the process of generating the reduced-image data, pixel values generated by the interpolation processing are not necessarily equal to corresponding pixel values in the original image data. Namely, the expanded-image data does not coincide with the original image-data. Therefore, picture quality decreases in the process of the compression and expansion processing, and the original image data can not be completely restored.

SUMMARY OF THE INVENTION

Therefore, an object of the present invention is to provide a method and apparatus for compressing and expanding digital image data efficiently, while limiting degradation in picture quality.

A compression apparatus for compressing image data according to the present invention has a reduced-image generating processor, a fluency transform processor, a mode setting processor, an error calculating processor and an optimum mode determining processor. The reduced-image generating processor transforms original image data partitioned into first blocks, each of which is composed of a plurality of pixels, to reduced-image data composed of a smaller number of pixels than that of the original image data. The fluency transform processor applies a fluency transform to the reduced-image data to generate expanded-image data partitioned into second blocks corresponding to the first blocks. The fluency transform has a plurality of modes. The mode setting processor selects one mode from the plurality of modes, thus the expanded-image data is generated in accordance with the selected one mode. The error calculating processor calculates an error, which represents a difference between the original image data and the expanded-image data, the error calculating processor calculating the error in each of the plurality of modes. Then, the optimum mode determining processor determines an optimum mode, by which the error becomes a minimum, among the plurality of modes. Preferably, the compression apparatus has a recording medium for recording the optimum mode and the reduced-image data.

On the other hand, an expansion apparatus for expanding the reduced-image data according to the present invention has a data reading processor, an optimum mode setting processor and an expanded-image generating processor. The data reading processor reads the reduced-image data and the optimum mode recorded in the recording medium. The optimum mode setting processor sets the optimum mode among the plurality of modes. Then, the expanded-image generating processor applies the fluency transform according to the optimum mode to the reduced-image data, thus expanded-image data corresponding to the original image data is obtained. As the optimum mode is determined in the compression apparatus in advance, the expanded-image data closer to the original image data can be obtained.

According to another aspect of the present invention, a compression apparatus for compressing image data has a reduced-image generating processor, a fluency transform processor, a contrast coefficient calculating processor, a contrast transform processor, a mode setting processor, an error calculating processor and an optimum mode/contrast determining processor. The reduced-image generating processor transforms original image data partitioned into first blocks, each of which is composed of a plurality of pixels, to reduced-image data composed of a smaller number of pixels than that of the original image data. The fluency transform processor applies a fluency transform to the reduced-image data to generate expanded-image data partitioned into second blocks corresponding to the first blocks. The fluency transform has a plurality of modes. The contrast coefficient calculating processor obtains a contrast coefficient in such a manner that a contrast of the expanded-image data becomes close to a contrast of the original image data by applying the contrast coefficient to the expanded-image data. The contrast transform processor applies the contrast coefficient to the expanded-image data to modify the contrast of the expanded-image data. Consequently, modified expanded-image data is obtained. The mode setting processor selects one mode from the plurality of modes, thus, the modified expanded-image data is generated in accordance with the selected one mode. The error calculating processor calculates an error, which represents a difference between the original image data and the modified expanded-image data, the error calculating processor calculating the error in each of the plurality of modes. The optimum mode/contrast determining processor determines an optimum mode, by which the error becomes a minimum, among the plurality of modes, and then sets a contrast coefficient corresponding to the optimum mode as an optimum contrast coefficient. Preferably, the compression apparatus has a recording medium for recording the optimum mode, the optimum contrast coefficient and the reduced-image data.

On the other hand, an expansion apparatus corresponding to the compression apparatus has a data reading processor, an optimum mode setting processor, an expanded-image generating processor and a contrast modifying processor. The data reading processor reads the reduced-image data, the optimum contrast coefficient and the optimum mode recorded in the recording medium. The optimum mode setting processor sets the optimum mode among the plurality of modes. The expanded-image generating processor applies the fluency transform according to the optimum mode to the reduced-image data such that expanded-image data corresponding to the original image data is obtained. The contrast modifying processor applies the contrast transform based on the optimum contrast coefficient to the expanded-image data, to obtain modified expanded-image data.

BRIEF DESCRIPTION OF THE DRAWINGS

The present invention will be better understood from the description of the preferred embodiments of the invention set forth below together with the accompanying drawings, in which:

FIG. 9 is a view showing a table T1 indicating 8 pixel values along the horizontal direction in a block.

FIG. 11 is a view showing a table T2 representing 8 pixel values along the vertical direction in the block.

DESCRIPTION OF THE PREFERRED EMBODIMENTS

Hereinafter, the preferred embodiments of the present invention are described with reference to the attached drawings.

Figure 1:
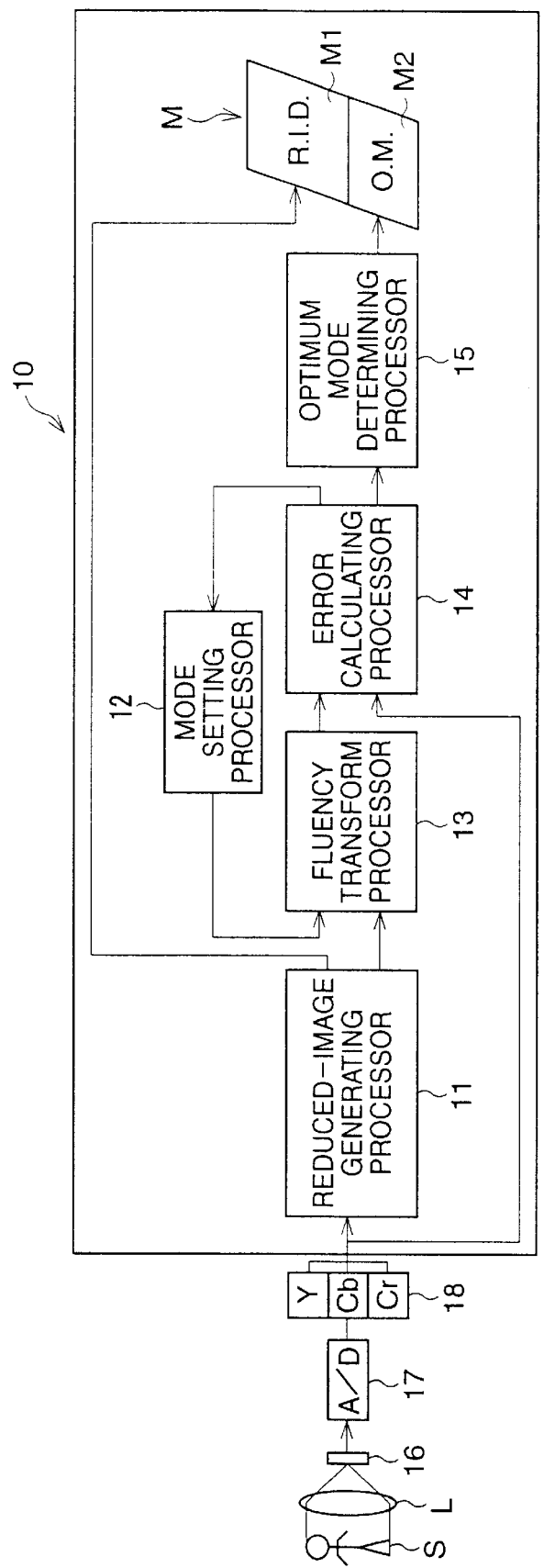
FIG. 1 is a block diagram of an image compression apparatus of a first embodiment.
Figure 2:
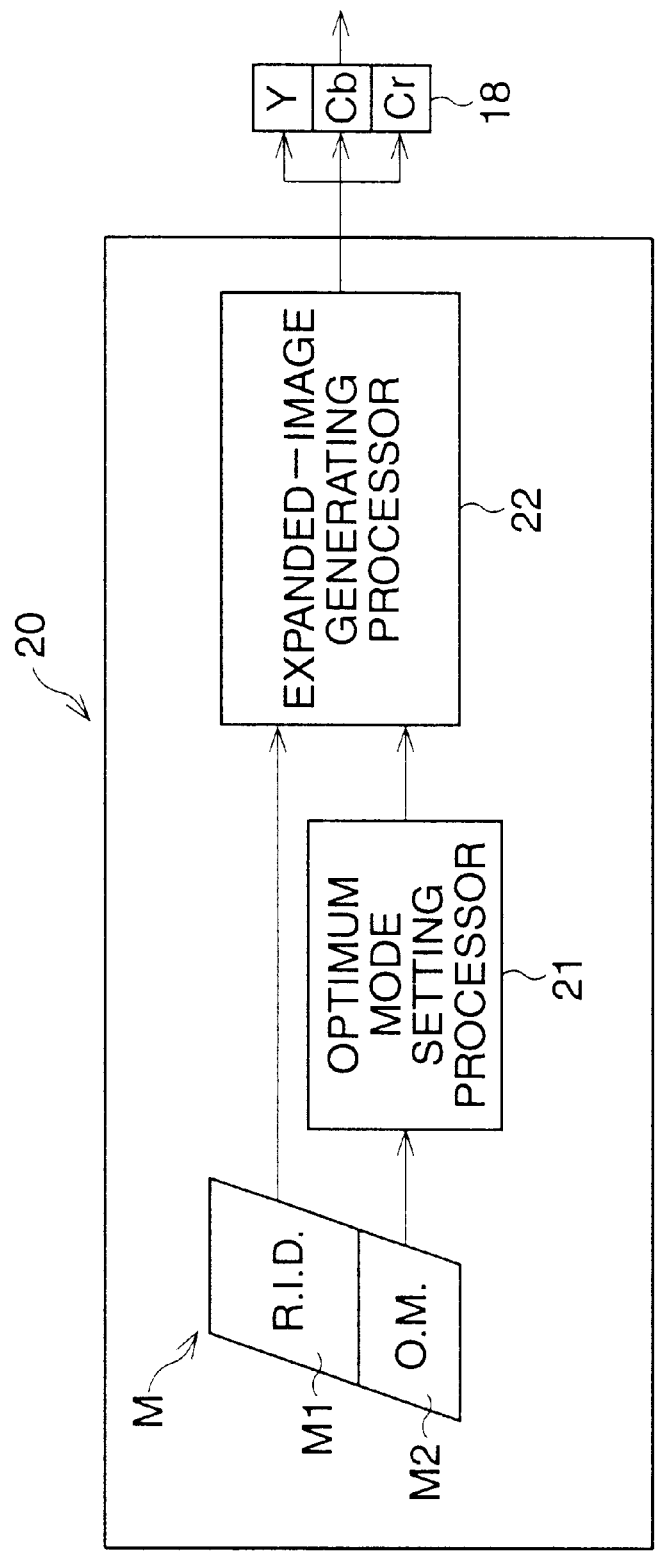
FIG. 2 is a block diagram of an image expansion apparatus of the first embodiment.

FIGS. 1 and 2 are block diagrams of an image compression and expansion apparatus according to a first embodiment of the present invention. Note that, the image compression and expansion apparatus of the first embodiment are incorporated in a digital still camera, and a CPU (not shown) controls the image compression and expansion apparatus.

Light, reflected on a subject S to be photographed, passes through a photographing optical system L, whereby a subject image is formed on a light-receiving area of a CCD 16. On the light-receiving area, red (R), green (G), blue (B) color filters are provided, thus analog image-pixel signals corresponding to the object image are generated in the CCD 16. The analog image-pixel signals are converted to the digital image signals in a A/D converter 17, and then are subjected to an image processing in an image processing circuit (not shown), so that luminance data Y and color difference data Cb,Cr are generated. The luminance data Y and color difference data Cb,Cr are temporally stored in a memory 18. The memory 18 is divided into mutually independent memory areas for storing the luminance data Y and color difference data Cb,Cr, separately. Each memory area has storage capacity of one frame worth of the subject image.

The luminance data Y and color difference data Cb,Cr temporally stored in the memory 18 are fed to an image compression apparatus 10. The image compression apparatus 10 has a reduced-image generating processor 11, a mode setting processor 12, a fluency transform processor 13, an error calculating processor 14, an optimum mode determining processor 15, and a recording medium M. The luminance data Y and color difference data Cb,Cr are subject to compression processing in the image compression apparatus 10, separately.

The original image data is partitioned into a plurality of pixel-blocks, and each pixel-block of the luminance data Y and color difference data Cb,Cr are subject to a reducing processing in the reduced-image generating processor 11 respectively. Thus, reduced-image data, composed of a smaller number of pixels than that of the original image data, is generated. The reduced-image data is stored in a recording area M1 of the recording medium M. Herein, the recording medium M is an IC memory card.

Further, regarding to the reduced-image data, an optimum mode of a fluency transform is determined through the mode setting processor 12, the fluency transform processor 13, the error calculating processor 14, and the optimum mode determining processor 15.

As described later, the reduced-image data is expanded by the fluency transform having a plurality of modes in the image expansion apparatus so as to generate expanded-image data, and the expanded-image data varies with a value of the selected mode. In this embodiment, the reduced-image data is temporally expanded by the fluency transform in the image compression apparatus 10, and then a mode, which generates the expanded-image data closest to the original image data, is determined among the plurality of modes as the optimum mode.

In the mode setting processor 12, one mode is selected among the plurality of modes, and then the reduced-image data is subjected to the fluency transform with the selected mode at the fluency transform processor 13. Thus, the expanded-image data is obtained corresponding to the original image data. A number of pixels of the expanded-image data coincides with that of the original image data. In the error calculating processor 14, an error indicating difference between the original image data and the expanded-image data is calculated. Namely, it is determined to what degree the expanded-image data coincides with the original image data.

After the error for the selected mode is calculated, the next mode is selected from the other modes in the mode setting processor 12. Then, the reduced-image data is subjected to the fluency transform depending upon the newly selected mode in the fluency transform processor 13, the error being calculated in the error calculating processor 14. In this way, the error is calculated with regard to all of the modes in order.

In the optimum mode determining processor 15, the optimum mode is determined among all of the modes. When the reduced-image data is subjected to the fluency transform depending upon the optimum mode, the error becomes a minimum. The optimum mode is recorded in a recording area M2 of the recording medium M.

As shown in FIG. 2, the image expansion apparatus 20 has the recording medium M, an optimum mode setting processor 21, and an expanded-image generating processor 22. The reduced-image data and the optimum mode are recorded in the medium M respectively.

When the optimum mode is read from the recording area M2, the mode of the fluency transform for expanding the reduced-image data is set to the optimum mode in the optimum mode setting processor 21. Then, the reduced-image data is subjected to the fluency transform in the expanded-image generating processor 22, thus the expanded-image data corresponding to the original image data is generated. The expanded-image data is temporally stored in the memory 18, and fed to a display (not shown), such as a LCD (Liquid Crystal Display). Consequently, a photographed image is displayed on the display.

Figure 3:
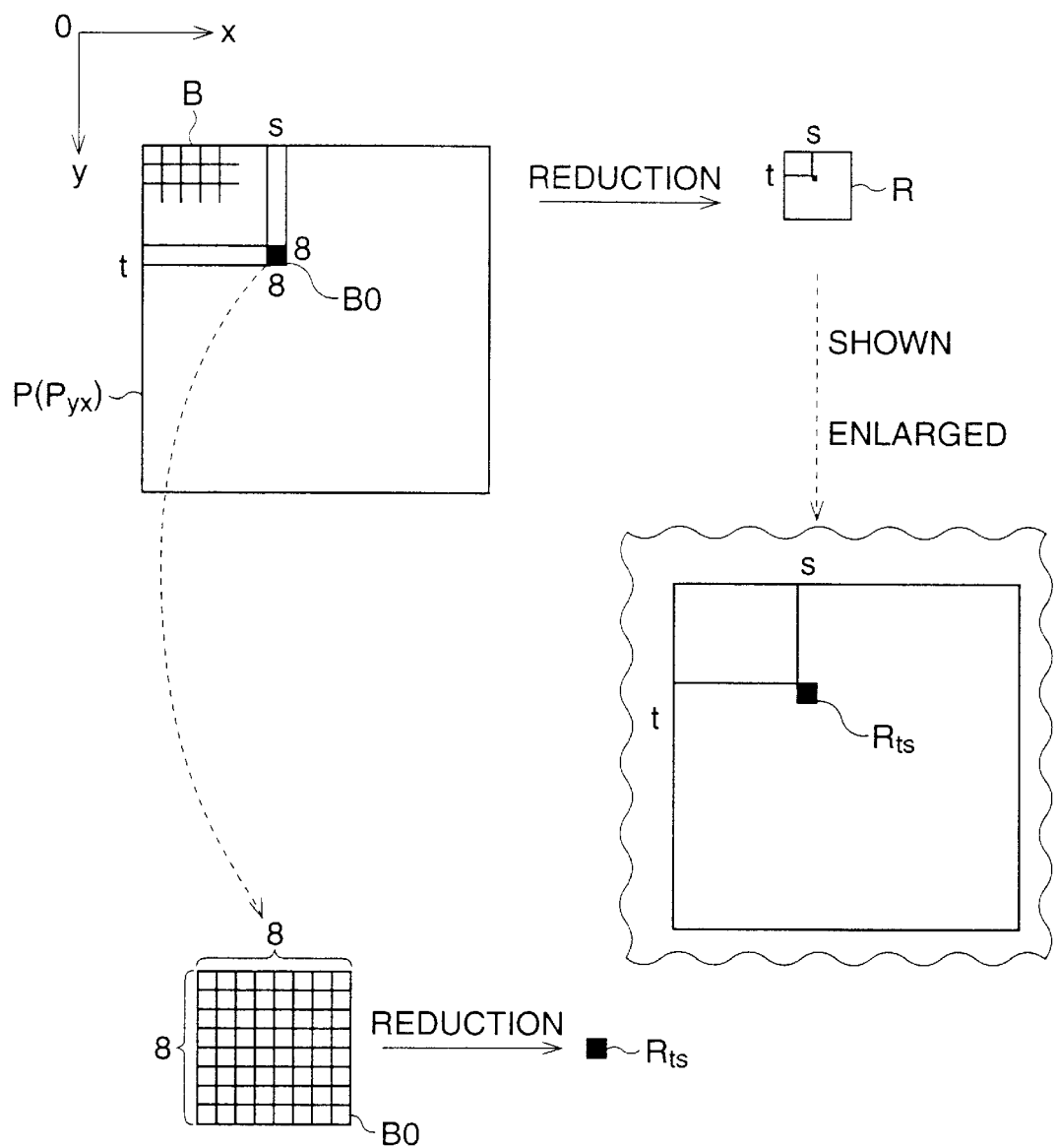
FIG. 3 is a view showing an image reduction processing to original image data.

FIG. 3 is a view showing an image reduction processing to the original image data.

The original image data, represented by "P", has 1024 ×512 pixels, and is partitioned into a plurality of blocks B, each of which is composed of 8×8 (=64) pixels $P_{yx}$. The plurality of blocks is arranged in a matrix. A range of value of each pixel $P_{yx}$ is 0 to 255, and pixel values are also represented by "$P_{yx}$". As shown in FIG. 3, x-y coordinates are defined with respect to the original image data P. A left corner of the original image data P is set as an origin, an x-axis is parallel to the horizontal (width) direction and an y-axis is parallel to the vertical (length) direction.

In the reduced-image generating processor 11 (shown in FIG. 1), an average value of the 8×8 pixels $P_{yx}$ is calculated in each of the blocks B. Consequently, the reduced-image data R composed of average pixels, each value being the average value of each of the blocks B, is generated. For example, as shown in FIG. 3, a block B0, positioned at the s-th block along the x-axis and the t-th block along the y-axis, is transformed to the average pixel $R_{ts}$ of the reduced-image data R on the basis of the following formula.

$$R_{ts} = \left( \sum_{x=s\times 8}^{s\times 8+7} \sum_{y=t\times 8}^{t\times 8+7} P_{yx} \right) / 64 \quad (1)$$

The average pixel $R_{ts}$ is positioned at the s-th pixel along the horizontal direction and the t-th pixel along the vertical direction in the reduced-image data R.

In this way, the reduced-image data R is obtained by calculating the average value of each block B. Namely, the original image data P is compressed. The pixel number of the reduced-image data R is 1/64 of that of the original image data P.

Figure 4:
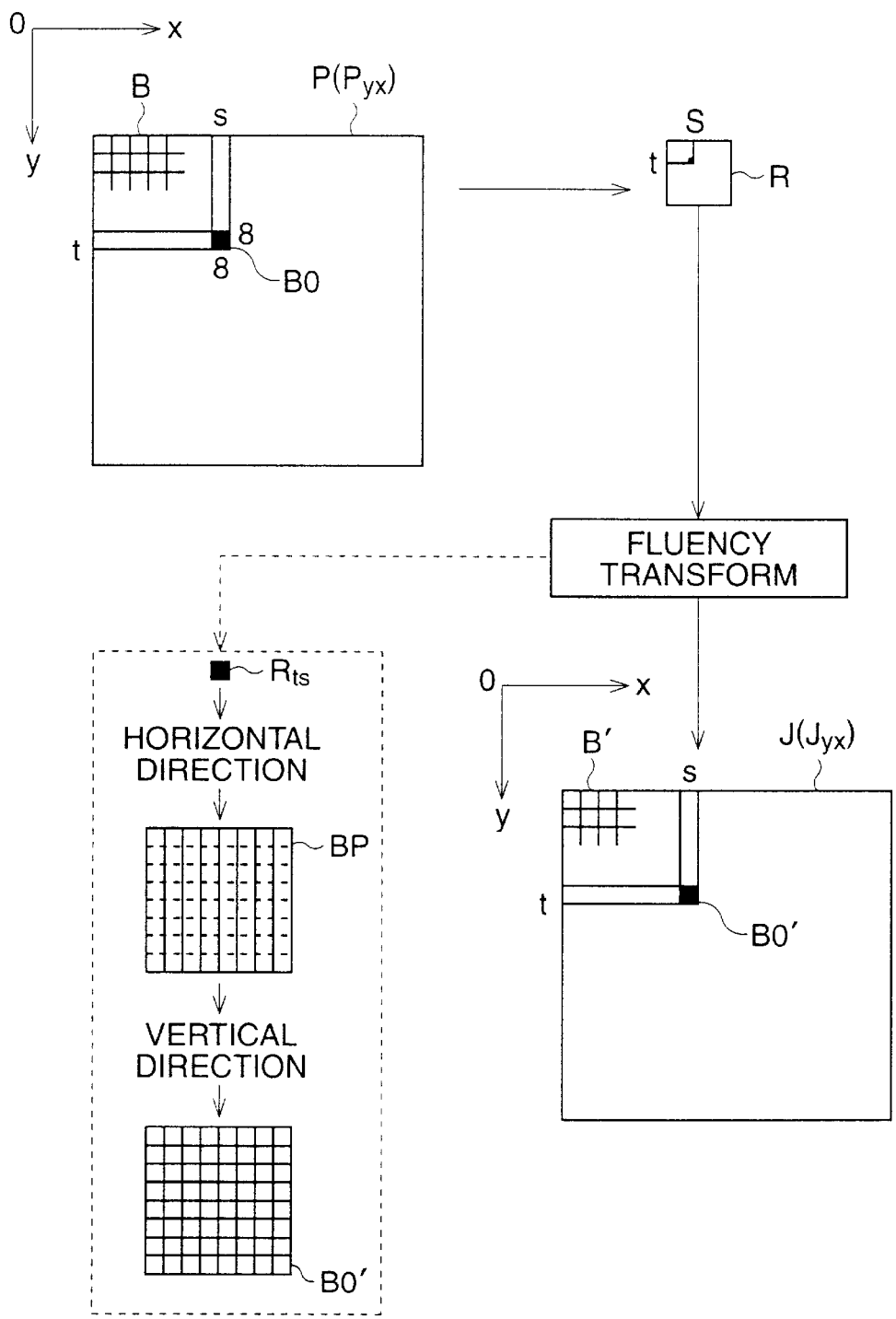
FIG. 4 is a view showing the expansion processing.

FIG. 4 is a view showing the expansion processing, executed in the expanded-image generating processor 22 in the image expansion apparatus shown in FIG. 2, and further in the fluency transform processor 13 of the image compression apparatus shown in FIG. 1.

Each average pixel of the reduced-image data R is firstly subjected to the fluency transform along the horizontal direction and is secondly subjected to the fluency transform along the vertical direction, so that the blocks B' composed of the 8×8 (=64) pixels are generated. For example, when the pixel $R_{ts}$, is subjected to the fluency transform, firstly, a block BP composed of 8 pixels in the horizontal direction (x-axis) is generated. Then, based on the 8 pixels of the block BP, the block B0' composed of 8×8 pixels is generated. The block B0' corresponds to the block B0 in the original image data P. When all pixels of the reduced-image data R are subjected to the fluency transform, the expanded-image data J partitioned into blocks B' composed of 8×8 pixels ($J_{yx}$) is generated. A number of blocks B' in the expanded-image data J are equal to that of the original image data P.

In this way, the reduced-image data R is transformed to the expanded-image data J. Namely, the reduced-image data R is expanded.

Hereinafter, with reference to FIGS. 5 to 11, the fluency transform is explained. Since the fluency transform is based on a fluency function, the fluency function will be described before the explanation of the fluency transform.

The fluency function, named by professors Kamada and Toraichi, is known as a function, which can represent various signals appropriately, for example, disclosed in the Mathematical Physics Journal (SURI-KAGAKU) No.363, pp8–12 (1993), published in Japan.

To begin with, a fluency function space is defined as follows:

It is supposed that a function space composed of a staircase (scaling) function, which is obtained on the basis of a rectangular function represented by formula (2), is represented as shown in following formula (3), the fluency function space is defined by formula (4).

$$\chi(t) = \begin{cases} 1, & |t| \le 1/2 \\ 0, & \text{otherwise} \end{cases} \quad (2)$$

$$^1S := \left\{ f : R \to C \mid f(t) = \sum_{n=-\infty}^{\infty} b_n \chi(t-n), \{b_n\} \in l^2 \right\} \quad (3)$$

$$^mS := \quad (4)$$
$$\left\{ h : R \to C \mid h(t) = \int_{-\infty}^{\infty} f(t-\tau)g(\tau)d\tau, \ f \in {}^{m-1}S, g \in {}^1S \right\}(m \ge 2)$$

The fluency function space of order m "$_mS$" is constructed by a function system, composed of an (m−2)-times continuously differentiable piecewise polynomial of degree m−1. The fluency function is a staircase (scaling) function when m is 1. The formula (2), which represents rectangular function, indicates a sampling basis at order m=1, and the formula (3) indicates the fluency function space at order m=1. The fluency function space $^mS$ is a series of a function space, which can connect from a staircase function space (m=1) to a Fourier band-limited function space (m=∞). Note that, a continuous differentiability m is regarded as a parameter.

The function system, characterizing the fluency function space $^mS$ and corresponding to an impulse response, is derived from a biorthogonal sampling basis theorem composed of a sampling basis and its biorthogonal basis. In this theorem, an arbitrary function f∈$^mS$ satisfies the following formulae (5) and (6) for a sampling value $f_n := f(n)$ $$f(t) = \sum_{n=-\infty}^{\infty} f_n [{}^m s] \phi(t-n) \quad (5)$$

$$f_n = \int_{-\infty}^{\infty} f(t) \overline{[{}^m s^*] \phi(t-n)} \, dt \quad (6)$$

where $[{}_{m_s}]\phi \in {}^mS$ satisfying $$[{}^m s]\phi \in {}^mS = (1/2\pi) \int_{-\infty}^{\infty} \left\{ \sum_{q=-\infty}^{\infty} ([(-1)^q (1 - q(2\pi/\omega))]^m \right\}^{-1} \times \exp(i\omega t) d\omega$$

on the other hand, $[{}_{m_s*}]\phi \in {}^mS$ satisfying $$\int_{-\infty}^{\infty} [{}^m s]\phi(t-n) \overline{[{}^m s^*]\phi(t-p)} \, dt = \begin{cases} 1, & p = n \\ 0, & p \ne n \end{cases}$$

The formula (5) indicates a function of the fluency transform derived from the sample value, and represents an expansion form, in which the sampling value sequences is a expansion coefficient. On the other hand, the formula (6)

indicates a function of the fluency inverse transform derived from the function of the fluency transform, and represents an operator, which obtains the sampling value sequences from the function of the fluency transform in the form of a integral transform. Note that, p is an arbitrary integer, and a bar expressed above "φ" in the formula (6) represents a conjugated complex of φ.

Further, in the fluency function space $^mS$, an orthogonal transform is derived from a fluency transform theorem. The orthogonal transform provides a generalization of a frequency concept in terms of agreement with Fourier transform at m=∞, and characterizes a harmonic structure. The theorem satisfies the following two formulae for an arbitrary function f∈$^mS$.

$$f(t) = (1/2\pi) \int_{-\pi}^{\pi} F(u)_{[^m o]}\phi(t, u) du \quad (7)$$

$$F(u) = \int_{-\infty}^{\infty} f(t) \overline{_{[^m o]}\phi(t, u)} dt \quad (8)$$

where $$_{[^m o]}\phi(t, u) = (1/2\pi) \int_{-\infty}^{\infty} \left\{ \sum_{p=-\infty}^{\infty} \delta(\omega - u + 2\pi p) \right\} \times$$

$$\left\{ \sum_{q=-\infty}^{\infty} (1 - q(2\pi/\omega))^{-2m} \right\}^{-1/2} \times \exp(i\omega t) d\omega$$

Note that, φ(u) is a function of the fluency function space $^mS$ and is expressed by using a Dirac delta function δ. "u" is an arbitrary variable.

The formula (7) is designated as a fluency orthogonal transform, and the formula (8) is designated as a fluency inverse orthogonal transform.

The fluency orthogonal transform expressed by the formula (7) can transform discrete sample values to continuous function values. Accordingly, in this embodiment, the fluency orthogonal transform is utilized for expanding the reduced-image data. Namely, the fluency transform is executed to each pixel of the reduced-image data R, and then the expanded-image data J is generated on the basis of the continuous function values.

Herein, some concrete fluency functions are explained. The order "m" of the fluency function space $^mS$ can be expressed as a parameter "m" of the fluency function, and when the parameter "m" is set to "½, . . . " in order, the fluency function are represented as shown below.

The most simple function system in the fluency function is obtained by setting the function "f(t)∈$^1S$" in the formula (3) to the rectangular function, which is represented by ")x(t)" in the formula (2), in place of the staircase function, and setting the function g ∈$^1S$ represented in the formula (4) to the above rectangular function. Namely, the function f(t) represented in the formula (3) becomes a rectangular function by applying a Delta (δ) function to an input function of the formula (3) in place of the rectangular function expressed by the formula (2). Then, the rectangular function f(t) is utilized for a function of the convolution integral in place of the function g(τ) represented in the formula (4), when transforming the function space $^{m-1}S$ to the function space $^mS$.

Figure 5A:
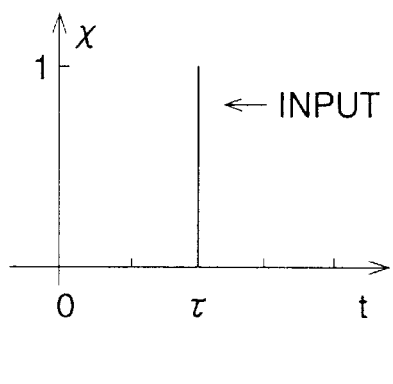
FIGS. 5A, 5B, 5C and 5D are views showing fluency functions varying with parameter m.

An input value at the formula (3) becomes the δ function shown in FIG. 5A in place of the rectangular function x(t) represented in the formula (2). The value of the δ function is 1 when variable t is τ, and is 0 when variable t is not τ. The fluency function f(t) with the parameter m=1 is represented as following formula, in place of the formula (3).

$$f(t) = \sum_{n=-\infty}^{\infty} \chi_n \chi(t-n) = \begin{cases} 1, & \tau - 1/2 < t < \tau + 1/2 \\ 0, & \text{otherwise} \end{cases} f(t) \in {}^1S \quad (9)$$

Figure 5B:
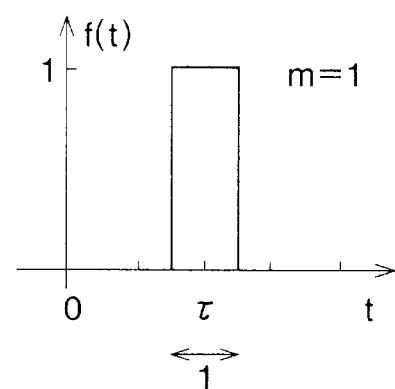

The fluency function f(t) in the formula (9) becomes a rectangular function, as shown in FIG. 5B. Then, the fluency function with the parameter m=2, denoted by "g(t)", is found by executing the convolution integral on the basis of the rectangular function f(t), as shown in the following formula.

$$g(t) = \int_{-\infty}^{\infty} f(t-\tau)f(\tau)d\tau = \begin{cases} t-\tau+1, & \tau-1 < t \leq \tau \\ -t+\tau+1, & \tau < t < \tau+1 \\ 0, & \text{otherwise} \end{cases} g(t) \in {}^2S \quad (10)$$

Figure 5C:
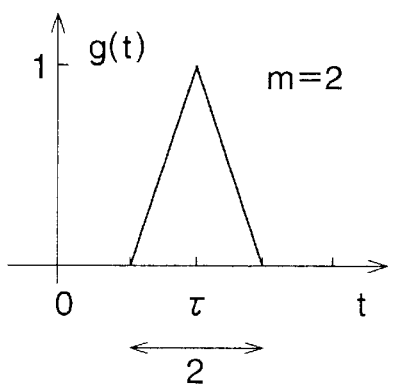

The fluency function g(t) obtained by the formula (10) is, as shown in FIG. 5C, a triangular function.

When the parameter m is 3,4,5. . . the convolution integral is executed, similarly to the parameter m=2. Namely, based on the fluency function at the parameter "m–1" and the function f(t) represented in the formula (9), the convolution integral is executed, so that the fluency function with the parameter m is generated. For example, when the parameter m is 3, based on the function g(t) obtained by the formula (10) and the function f(t) in the formula (9), the convolution integral is executed, so that a fluency function h(t) shown in FIG. 5D, which is smooth and expressed by a curve, is generated. The fluency function h(t) is expressed as $$h(t) = \int_{-\infty}^{\infty} g(t-\tau)f(\tau)d\tau \; h(t) \in {}^3S = \quad (11)$$

$$\begin{cases}
-\frac{1}{4}(t-\tau+2)^2, & \tau-2 < t < \tau-\frac{3}{2} \\
\frac{3}{4}(t-\tau+1)^2 + \frac{1}{2}(t-\tau+1), & \tau-\frac{3}{2} \leq t < \tau-1 \\
\frac{5}{4}(t-\tau+1)^2 + \frac{1}{2}(t-\tau+1), & \tau-1 \leq t < \tau-\frac{1}{2} \\
-\frac{7}{4}(t-\tau)^2 + 1, & \tau-\frac{1}{2} \leq t < \tau+\frac{1}{2} \\
\frac{5}{4}(t-\tau+1)^2 - \frac{1}{2}(t-\tau+1), & \tau+\frac{1}{2} \leq t < \tau+1 \\
\frac{3}{4}(t-\tau+1)^2 - \frac{1}{2}(t-\tau+1), & \tau+1 \leq t < \tau+\frac{3}{2} \\
-\frac{1}{4}(t-\tau-2)^2, & \tau+\frac{3}{2} \leq t < \tau+2 \\
0, & \text{otherwise}
\end{cases}$$

In this way, the fluency function varies with the parameter m. The fluency functions, shown in FIGS. 5B to 5D, correspond to sampling bases related to the fluency function space $^mS$ disclosed in the Mathematical Physics Journal described above. In this embodiment, the fluency transform (orthogonal transform) to the reduced-image data R is executed on the basis of the fluency function in the case of the parameter m=1, 2 and 3.

Figure 6:
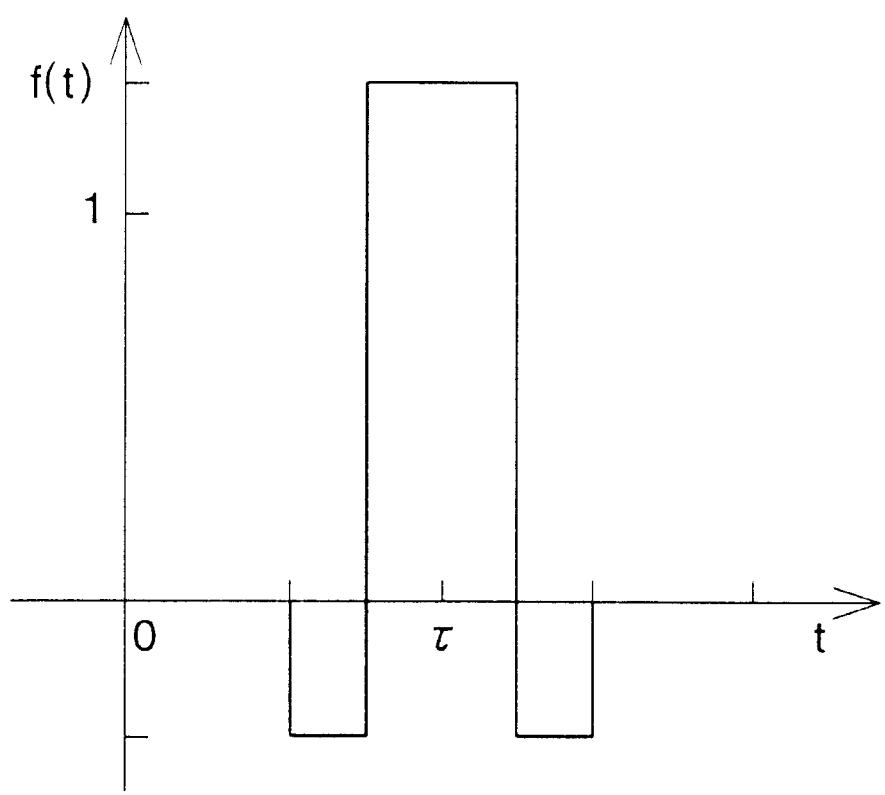
FIG. 6 is a normalized fluency function at the parameter m=1.

However, if the function f(t), obtained by the formula (9) and shown in FIG. 5B, is directly utilized at the convolution integral at the parameter m≧3, the value of the fluency function at t=τ does not coincide with 1. Accordingly, in this embodiment, normalized function shown in FIG. 6 is applied to the convolution integral in place of the function f(t) shown in FIG. 5B. The normalized function f(t) is normalized as for an area, which is formed on the basis of the t-axis and the function f(t), such that the area of the function f(t) is always 1. For example, when the parameter m is 3, the normalized function f(t) is represented by $$f(t) = \begin{cases} -\frac{1}{3}, & \tau - 1 < t \leq \tau - \frac{1}{2} \\ \frac{4}{3}, & \tau - \frac{1}{2} < t \leq \tau + \frac{1}{2} \\ -\frac{1}{3}, & \tau + \frac{1}{2} < t < \tau + 1 \\ 0, & \text{otherwise} \end{cases} \quad (12)$$

Thus, the value of the fluency function is always 1 at t=τ.

Figure 7:
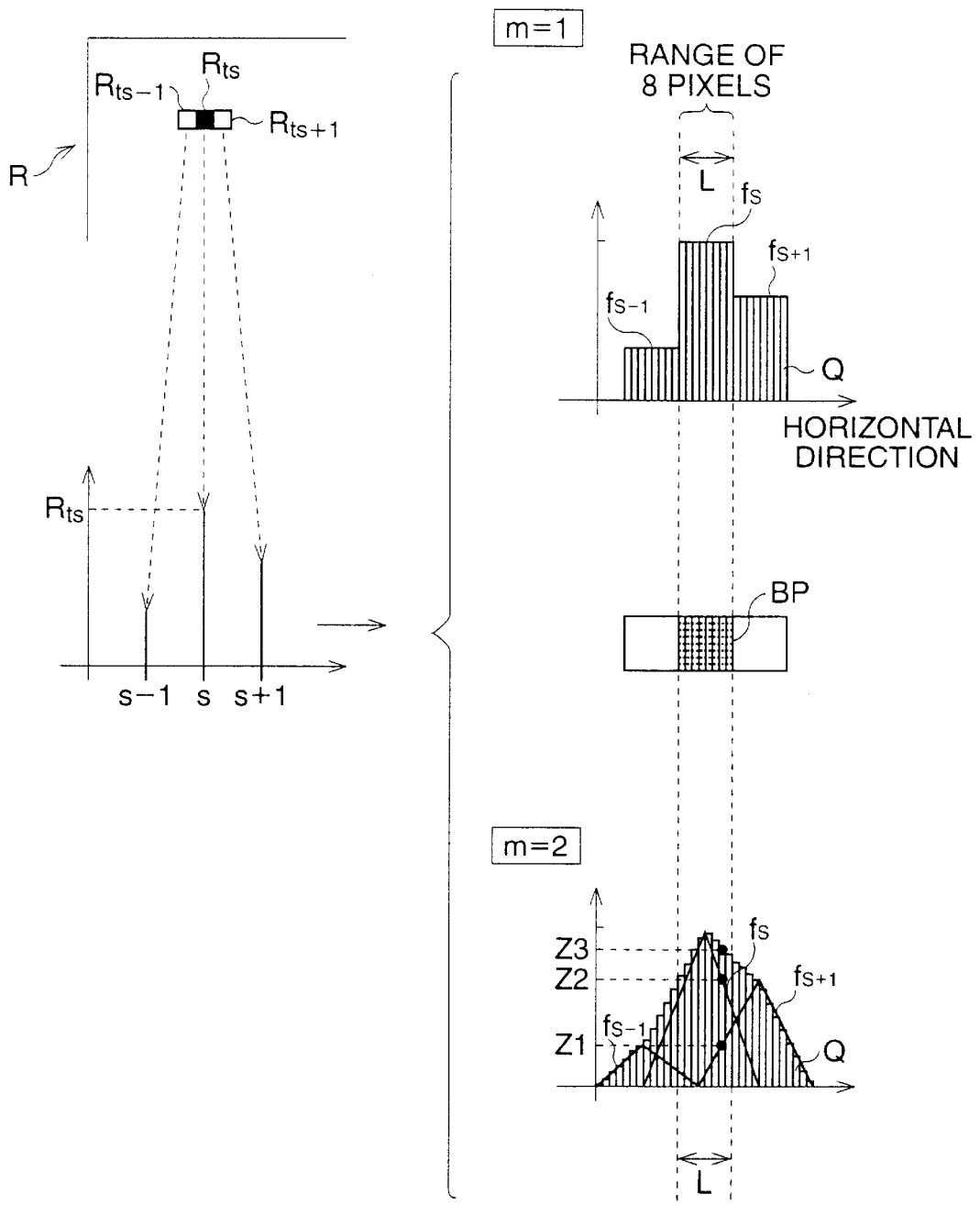
FIG. 7 is a view showing a fluency transform processing.

FIG. 7 is a view showing the fluency transform for generating the expanded-image data J. Note that, for ease of explanation, the fluency transform is executed for only the horizontal direction, or x-axis.

Herein, as one example, three pixels $R_{ts-1}$, $R_{ts}$, $R_{ts+1}$, adjoining each other in the reduced-image data R, are subjected to the fluency transform by the formula (7) along the horizontal direction. Each pixel value of the three pixels $R_{ts-1}$, $R_{ts}$, $R_{ts+1}$, is different respectively. The input function F(u) at the formula (7) corresponds to each pixel value of the three pixels $R_{ts-1}$, $R_{ts}$, $R_{ts+1}$.

When the input function F(u) at the formula (7) is a discrete value corresponding to function, the output function f(t) in the formula (7) corresponds to the fluency functions shown in FIGS. 5A to 5D. Therefore, by the fluency orthogonal transform, the output function f(t) having continuous values is generated. When the parameter m=1, an output function $f_s$, obtained by executing the fluency transform to the pixel value $R_{ts}$, is a rectangular function, as shown in FIG. 7. Each pixel value of 8 pixels along the horizontal direction (x-axis) in the block BP, represented by a bar "Q", is equal.

Then, when the parameter m is 1, the range of the output function $f_s$ along the x-axis corresponds to the range of the horizontal direction of the block BP (represented by "L" in FIG. 7). The range of the output functions $f_{s-1}$, $f_{s+1}$, obtained by executing the fluency transform to the pixel values $R_{ts-1}$, $R_{ts+1}$, does not overlap the range of the output function $f_s$.

On the other hand, when the parameter m is 2, each of the functions $f_{s-1}$, $f_s$, $f_{s+1}$, obtained by the formula (7) and corresponding to the pixel value $R_{ts-1}$, $R_{ts}$, $R_{ts+1}$, respectively, is a triangular function. In the case of the parameter m=2, each range of functions $f_{s-1}$, $f_s$, $f_{s+1}$, overlaps each other as the range L of the block BP is defined in accordance with the parameter m=1. The difference between the range of the function f(t) at the parameter m=1 and that of the function f(t) at the parameter m=2 is shown in FIGS. 5B and 5C.

Accordingly, each pixel value, represented by the bar Q, is obtained by adding each value of the functions $f_{s-1}$, $f_s$, $f_{s+1}$. Namely, each value of the functions $f_{s-1}$, $f_s$, $f_{s+1}$, corresponding to each position of 8 pixels in the horizontal direction of the block BP, is added, so that each pixel value of 8 pixels along the horizontal direction (x-axis) is obtained. For example, regarding the second pixel from the right end in the block BP, the pixel value Z3 is obtained by adding the pixel value Z2, which is the value of the function $f_s$, and the pixel value Z1, which is the value of the function $f_{s-1}$.

Figure 5D:
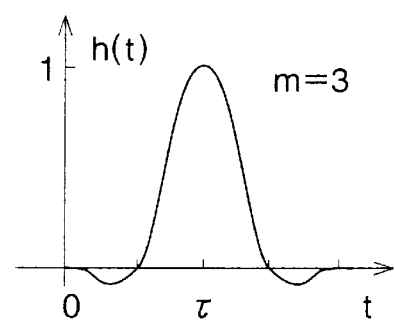

As the parameter "m" becomes large, the range of the function f(t) along the horizontal direction becomes larger, as shown in FIG. 5D. In this case, each pixel value of the block BP, corresponding to the pixel $R_{ts}$ is calculated on the basis of the pixel value $R_{ts-1}$, $R_{ts+1}$ and other adjacent pixels in the reduced-image data R.

After the fluency transform along the horizontal direction is executed, the fluency transform along the vertical direction (y-axis) is executed to the block BP, so that the block B0' composed of 8×8 pixels is generated. Namely, when executing the fluency transform along the x-axis and the y-axis for each pixel of the reduced-image data R in order, the expanded-image data J is generated. Each pixel value of the expanded-image data J depends upon the parameter m, and the parameter m is the mode of the fluency transform.

With reference to FIGS. 8 to 11, expansion processing by the fluency transform is explained. In this embodiment, the parameter m is one of 1 to 3, and adjacent pixels to the pixel necessary for finding each pixel of the block BP, are represented by $R_{ts-2}$, $R_{ts-1}$, $R_{ts+1}$, $R_{ts+2}$, $R_{t-2s}$, $R_{t-1s}$, $R_{t+1s}$, $R_{t+2s}$. Note that, values of the pixels $R_{ts-2}$, $R_{ts-1}$, $R_{ts+1}$, $R_{ts+2}$, $R_{t-2s}$, $R_{t-2s}$, $R_{t+1s}$, $R_{t'2s}$. $R_{t+2s}$ are also expressed by "$R_{ts-2}$, $R_{ts-1}$, $R_{ts+1}$, $R_{ts+2}$, $R_{t-2s}$, $R_{t-1s}$, $R_{t+1s}$, $R_{t+2s}$".

Figure 8:
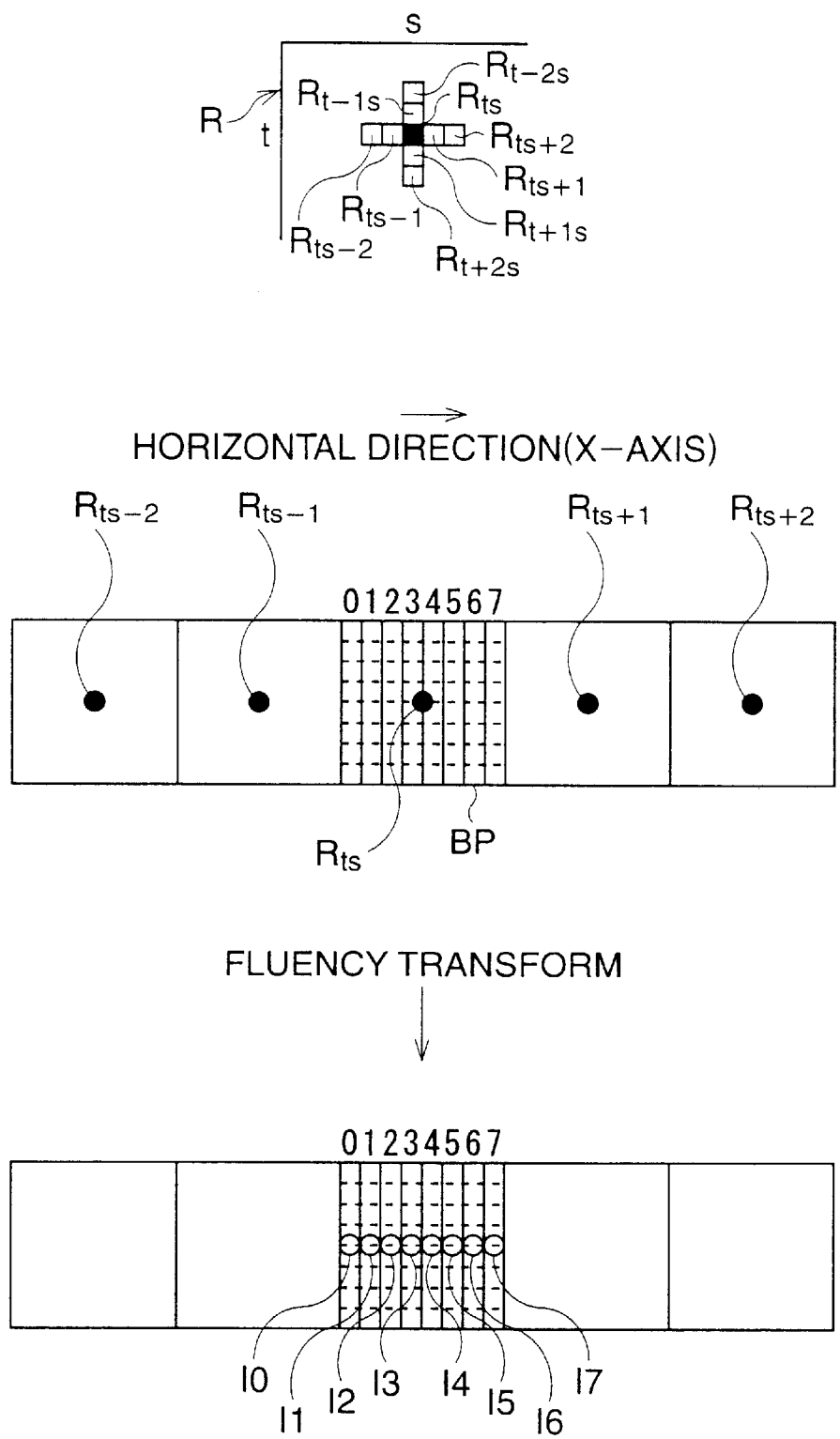
FIG. 8 is a view showing the fluency transform along a horizontal direction.

FIG. 8 is a view showing the fluency transform along the horizontal direction (x-axis). The positions of 8 pixels in the block BP are expressed by "0, 1, 2 . . . 7" in order.

Firstly, the pixel $R_{ts}$ is arranged at the center of the generated block BP (between third position and fourth position), and then the fluency transform at the parameter m (=1, 2 or 3) is executed along the horizontal direction (x-axis). Similarly to the pixel $R_{ts}$ the pixels $R_{ts-2}$, $R_{ts-1}$, $R_{ts+1}$, $R_{ts+2}$, $R_{t-2s}R_{t-1s}R_{t+1s}$, $R_{t+2s}$ are subject to the fluency transform in the horizontal direction, at the center of each block generated by the fluency transform. 8 pixels, represented by "I0, I1, I2, I3, I4, I5, I6, I7" in FIG. 8, are based on the pixels $R_{ts-2}$, $R_{ts-1}$, $R_{ts}$, $R_{ts+1}$, $R_{ts+2}$.

FIG. 9 is a view showing a table T1 indicating 8 pixel values along the horizontal direction in the block BP, obtained by the fluency transform. In the table T1, pixel values corresponding to the parameter 1, 2 and 3 respectively, are shown, and each pixel value is obtained on the basis of the formula (7). Herein, pixel values along horizontal direction are also represented by "I0, I1, I2, . . . I7", which are identical with the 8 pixels along the horizontal direction.

For example, when the parameter m is 1, all of the pixel values I0 to I7 coincide with the pixel value $R_{ts}$. As described above using FIG. 7, the pixel values $R_{ts-2}$, $R_{ts-1}$, $R_{ts+1}$, $R_{ts+2}$, except for the pixel value $R_{ts}$ in the reduced-image data R, do not affect the generation of the pixel values I0 to I7 when the parameter m=1. On the other hand, when the parameter m is 2, as shown in FIG. 7, the pixel values I0 to I7 are generated on the basis of the pixel values $R_{ts-1}$, $R_{ts}$, $R_{ts+1}$ and the addition of the value of the function $f_{s-1}$, $f_s$, $f_{s+1}$, at the formula (7). Namely, the pixel values I0 to I7 are respectively generated by adding each value of the functions $f_{s-1}$, $f_s$, $f_{s+1}$, which corresponds to the pixel position, as shown in FIG. 7. When the parameter m is 3, the pixel values I0 to I7 are obtained on the basis of the pixel values $R_{ts-2}$, $R_{ts-1}$, $R_{ts}$, $R_{ts+1}$, $R_{ts+2}$. After the fluency transform in the horizontal direction is executed, secondly, the fluency transform in the vertical direction (y-axis) is executed to the block BP composed of 8 pixels I0 to I7.

Figure 10:
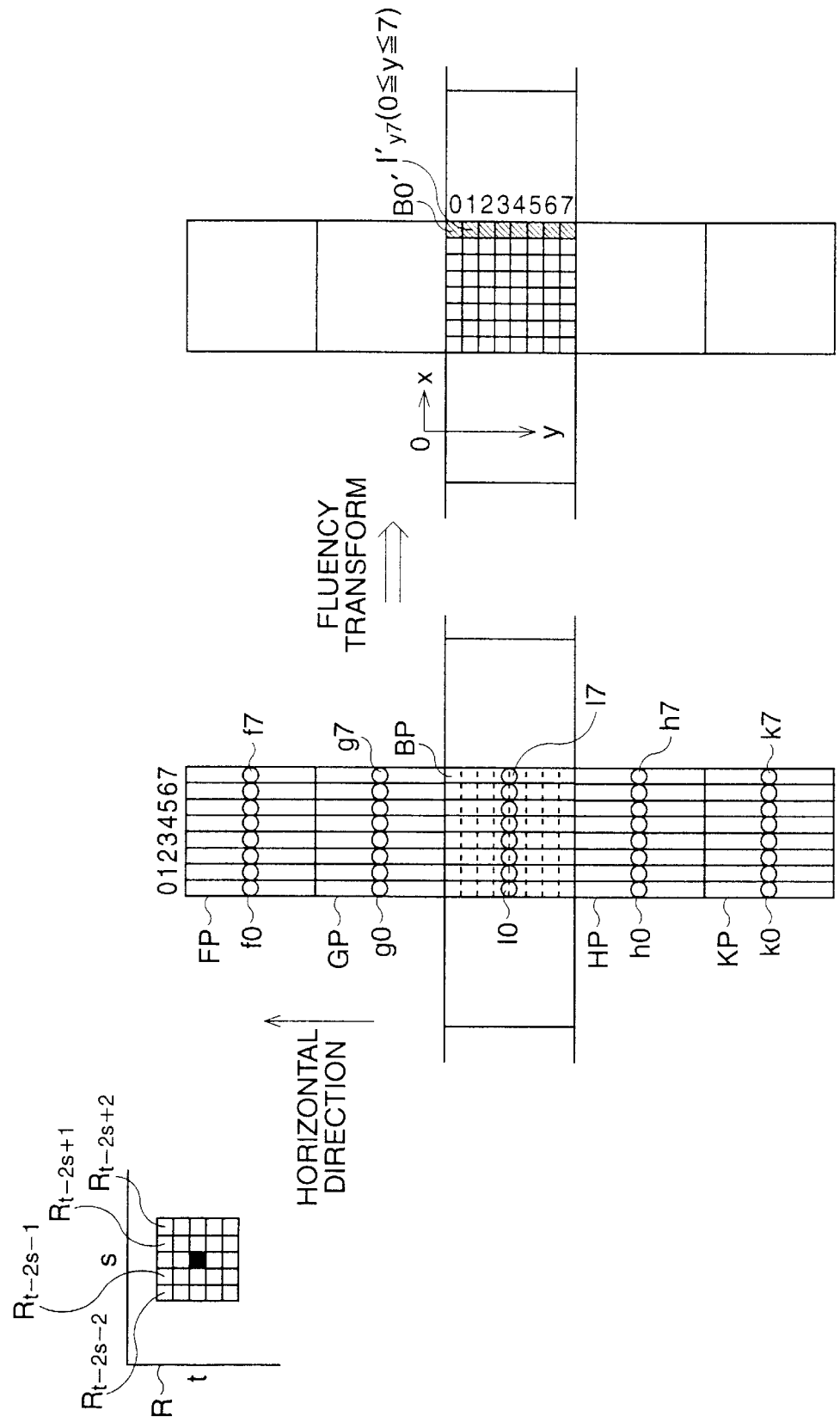
FIG. 10 is a view showing the fluency transform along a vertical direction.

FIG. 10 is a view showing the fluency transform along the vertical direction. Similarly to the horizontal direction, the positions of 8 pixels along the vertical direction (y-axis) are expressed by ",0 1, 2, . . . 7" in order.

When the fluency transform along the horizontal direction is executed to each pixel of the reduced-image data R, blocks FP, GP, HP, KP, corresponding to the pixels $R_{t-2s}$, $R_{t-1s}$, $R_{t+1s}$, $R_{t+2s}$, respectively, are obtained. Each pixel of the blocks FP, GP, HP, KP is designated by "f0, f1, . . . f7", "g0, g1, . . . g7", "h0, h1, . . . h7", "k0, k1, . . . k7", respectively. Note that, Each pixel of the blocks FP, GP, HP, KP is obtained on the basis of other adjacent pixels in the reduced-image data R in addition to $R_{ts-2}$, $R_{ts-1}$, $R_{ts}$, $R_{ts+1}$, $R_{ts+2}$. For example, "f0, f1, ... f7" of the block FP is obtained by "$R_{t-2s-2}$, $R_{t-2s-1}$, $R_{t-2s}$, $R_{t-2s+1}$, $R_{t-2s+2}$.

The 8 pixels "I0, I1, I2, ... I7" are subjected to the fluency transform along the vertical direction (y-axis) at the center of the block BP (between the third position and the fourth position), on the basis of the formula (7). The other pixels "f0, f1, ... f7", "g0, g1, ... g7", "h0, h1, ... h7", ",k0, k1, ... k7" are also subjected to the fluency transform along the vertical direction respectively, similarly to the 8 pixels I0 to I7. Then, 8×8 pixels of the block B0' are obtained by adding each value of the output values f(t) (at the formula (7)) based on the pixels "f0, f1, ... f7" corresponding to the pixel positions "0, 1, 2, ... 7", the output functions f(t) based on the pixels "g0, g1, ... g7" corresponding to the pixel positions "0, 1, 2, ... 7", the output values f(t) based on the pixels "I0, I1, ... I7" corresponding to the pixel positions "0, 1, 2, ... 7", the output values f(t) based on the pixels "h0, h1, ... h7" corresponding to the pixel positions "0, 1, 2, ... 7" and the output values f(t) based on the pixels "k0, k1, ... k7" corresponding to the pixel positions "0, 1, 2, 7". When the pixel value of the block B0' is denoted by $I'_{yx}$ ($0 \leq x \leq 7$, $0 \leq y \leq 7$), the pixel value $I'_{yx}$ and the pixel value $J_{yx}$ of the block B0' satisfies the following formula.

$$J_{t \times 8+y, s \times 8+x} = I'_{yx}{}^{(s,t)} \quad (13)$$

FIG. 11 is a view showing a table T2 representing 8 pixel values $I'_{y7}$ ($0 \leq y \leq 7$), shown by oblique line in FIG. 10. When the parameter m is 1, all of the pixel values $I'_{y7}$ are I7, when the parameter m is 2, the pixel values $I'_{y7}$ are obtained on the basis of the pixel values I7, g7, h7. When the parameter m is 3, the pixel values $I'_{y7}$ are obtained on the basis of the pixel values f7, g7, I7, h7, k7. Other pixels $I_{yx}$ ($0 \leq x \leq 6$, $0 \leq y \leq 7$) are also obtained on the basis of the pixels fx, gx, Ix, hx, kx (x=0 to 6). In this case, the pixel values $I_{yx}$ ($0 \leq x \leq 6$, $0 \leq y \leq 7$) are obtained by substituting fx, gx, Ix, hx, kx (x=0 to 6) for f7, g7, I7, h7, k7 represented in FIG. 11.

In this way, the block B0' corresponding to the block B0 composing the original image data P is generated by executing the fluency transform along the horizontal and the vertical direction. The fluency transform is executed for each pixel of the reduced-image data R in order, so that all of the block B' is generated, namely, the expanded-image data J is obtained.

Figure 12:
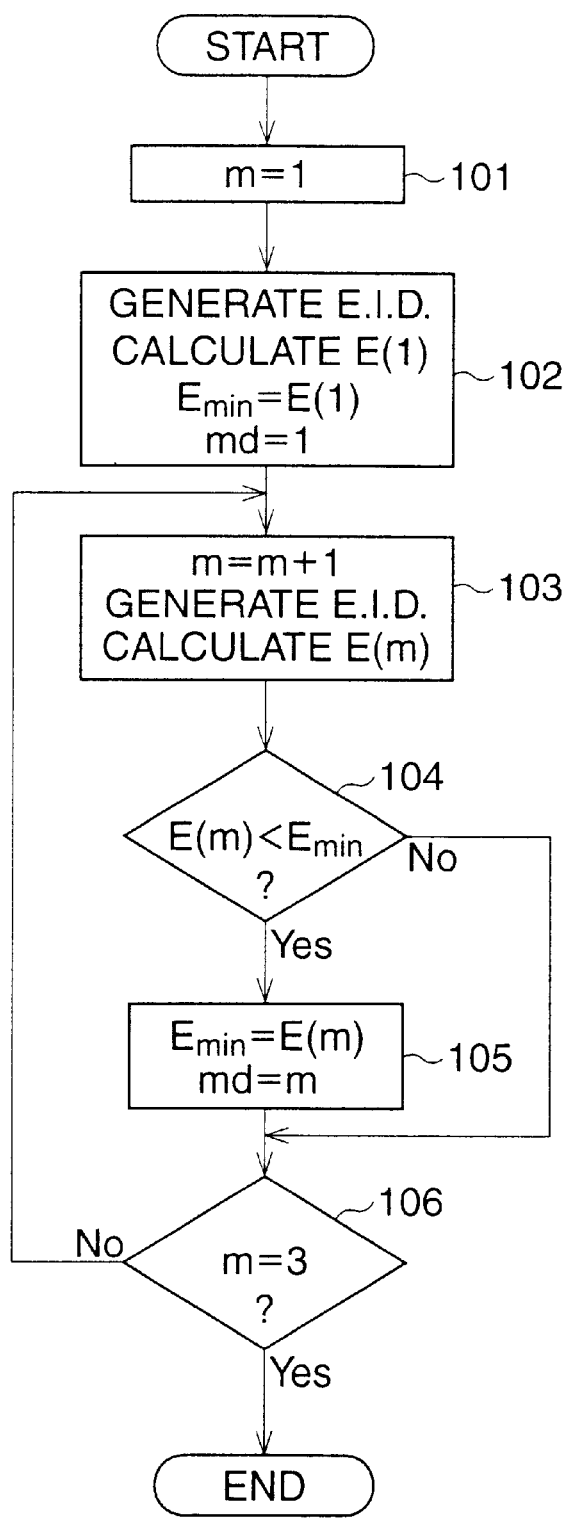
FIG. 12 is a view showing a flowchart of the process for determining the optimum mode.

FIG. 12 is a view showing a flowchart of the process for determining the optimum mode. In FIG. 12, the optimum mode for the pixel Rt, of the reduced-image data R is determined.

In Step 101, the parameter m is set to 1. Then, in Step 102, the block B0' composed of 8×8 pixels is generated by the fluency transform, and then the error at m=1, represented by E(1), is calculated on the basis of a valuation function $E^{(a,t)}$. The valuation function $E^{(s,t)}$ calculates the sum of the square of a difference between each pixel value $P_{yx}$ in the block B0 and corresponding pixel value $J_{yx}$ in the block B0', as expressed by the following formula $$E^{(s,t)} = \sum_{x=s \times 8}^{s \times 8+7} \sum_{y=t \times 8}^{t \times 8+7} (J_{yx}^m - P_{yx})^2 \quad (14)$$

where $J^m{}_{yx}$ represents the pixel value $J_{yx}$ at the parameter m (=1, 2 or 3)

Furthermore, at Step 102, an optimum parameter "md", namely, the optimum mode, is set to 1, and then a minimum error $E_{min}$ is set to E(1).

In Step 103, the parameter m is incremented by 1, and the error E(m) is calculated on the basis of the formula (14) and the incremented parameter m.

In Step 104, it is determined whether the error E(m) obtained at Step 103 is smaller than the minimum error $E_{min}$. When it is determined that the error E(m) is smaller than the minimum error Eke, the process goes to Step 105, wherein the error E(m) is newly set to the minimum error $E_{min}$, and the parameter m is set to the optimum parameter md. After Step 105 is executed, the process goes to Step 106. On the other hand, when it is determined that the error E(m) is not smaller than the minimum error $E_{min}$ at Step 104, the process skips Step 105 and directly goes to Step 106.

In Step 106, it is determined whether the parameter m is 3. When it is determined that the parameter m is 3, the process for determining the optimum mode is terminated. On the other hand, when it is determined that the parameter m is not 3, the process returns to Step 103.

Steps 103 to 106 are repeatedly executed, thus the optimum mode md, which makes the error E(m) minimum, is determined among 1 to 3.

The process is executed regarding the other blocks in the expanded-image data J, similarly to the block B0', thus the optimum mode is determined in each block.

In this way, in the first embodiment, based on the original image data P, the reduced-image data R composed of smaller number of pixels than that of the original image data is generated in the image compression apparatus 10. Then, in the image expansion apparatus 20, the reduced-image data R is subjected to the fluency transform, so that the expanded-image data J corresponding to the original image data P is generated. The fluency function varies with the value of the parameter m as shown in FIGS. 5A to 5D, therefore, an appropriate interpolation can be performed by using various functions, compared with the conventional interpolation, such as the linear interpolation, as shown in FIGS. 5A to 5B.

In the image compression apparatus 10, the parameter m is set to 1,2 and 3 in order, and the error E(m) indicating the difference between the original image data P and the expanded-image data J is calculated in accordance with the parameter m. Then, the optimum parameter md, by which the error E(m) becomes a minimum, is determined among 1 to 3, and is recorded in the recording medium M with the reduced-image data R. When expanding the reduced-image data R in the image expansion apparatus 20, the fluency transform with the optimum parameter md is executed, thus the expanded-image data J, which is closest to the original image data P among three obtainable expanded-imagedataJ (m=1,2,3), is obtained. Namely, in this embodiment, the fluency transform, which should be executed in the process of the expansion processing so as to restore the original image data P, is executed in the image compression apparatus 10, and the optimum parameter md is found in advance. Then, the fluency transform using the optimum parameter md is executed in the image expansion apparatus 20, so that the expanded-image data J, which is closer to the original image data P compared with a expanded-image data obtained by a conventional interpolation processing including the linear interpolation, can be obtained.

Furthermore, the optimum parameter md is determined for each block B' in the expanded-image data J, thus the expanded-image data J, further closer to the original image data P, is obtained.

The range of the parameter m is not restricted to 1 to 3, and may be set to an arbitrary range (for example, 1 to 5).

When obtaining the reduced-image data R, other methods, such as a down sampling method transforming an imageresolution, can be applied in place of the calculation of the average value. Further, in place of the digital still camera, a program executing the image compression and expansion described above may be stored in a memory in a computer system so as to compress and expand the image data recorded in the computer system.

FIGS. 13 to 17 show an image compression and expansion apparatus of a second embodiment. The second embodiment is different from the first embodiment in that a contrast transform processing is executed with the fluency transform. In the contrast processing, a contrast of the expanded-image data is modified. Since other portions are substantially similar to the first embodiment, different constructions are explained below.

Figure 13:
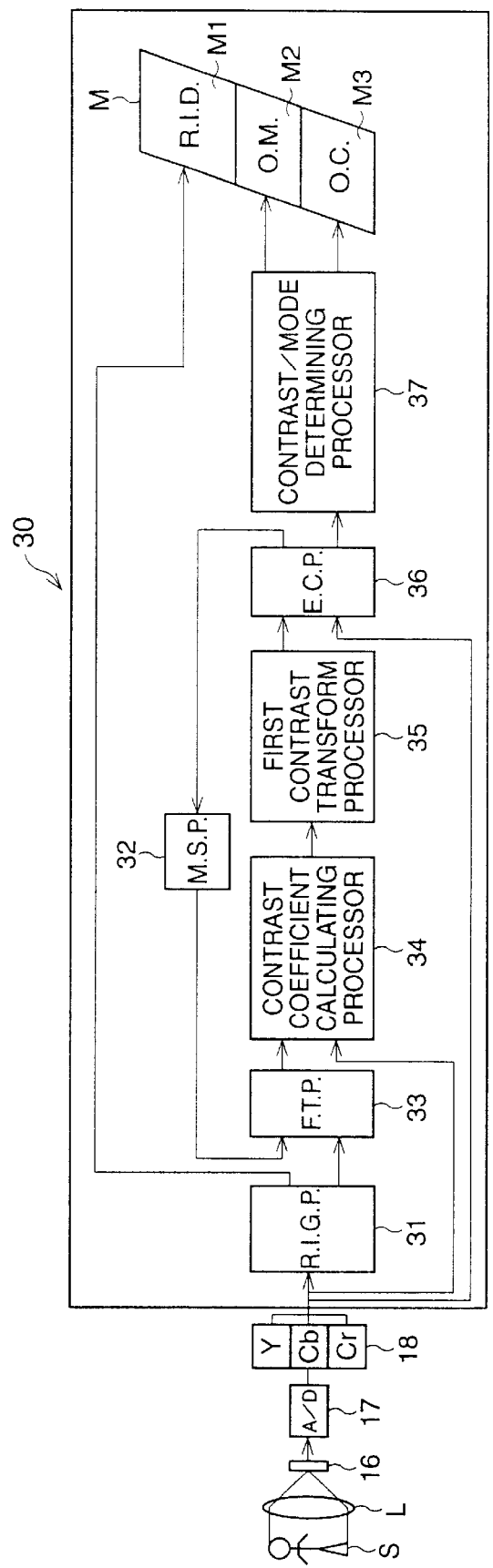
FIG. 13 is a block diagram of an image compression apparatus of a second embodiment.
Figure 14:
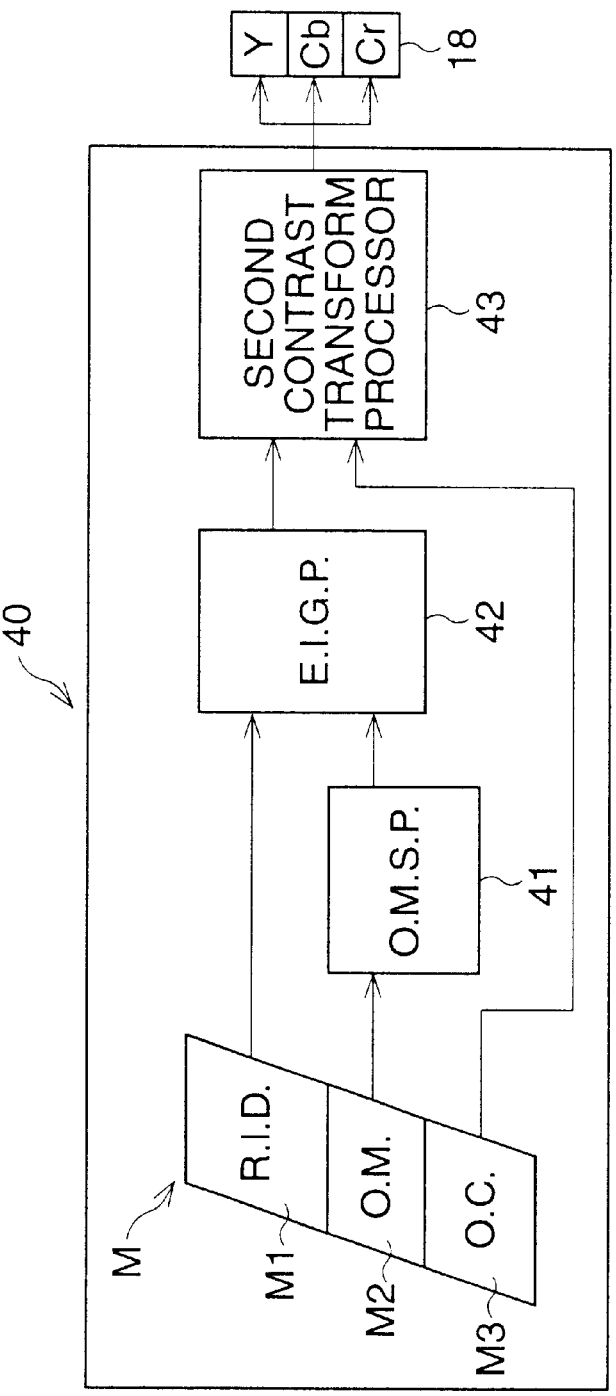
FIG. 14 is a block diagram of an image expansion apparatus of the second embodiment.

FIG. 13 is a block diagram of an image compression apparatus, and FIG. 14 is a block diagram of an image expansion apparatus. The image compression apparatus 30 has a contrast coefficient calculating processor 34, a first contrast transform processor 35, and a contrast/mode determining processor 37, in addition to a reduced-image generating processor 31, a mode setting processor 32, a fluency transform processor 33, an error calculating processor 36. On the other hand, an image expansion apparatus 40 has a second contrast transform processor 43, in addition to an optimum mode setting processor 41, a expanded-image generating processor 42.

In the contrast coefficient calculating processor 34, a contrast coefficient for compensating a lowering of a contrast in the expanded-image data is obtained. In the first contrast transform processor 35, the expanded-image data is compensated in accordance with the contrast coefficient, thus a modified expanded-image data is obtained. The compensation processing is executed such that a contrast of the expanded-image data becomes close to that of the original image data. Concretely, the expanded-image data is multiplied by the contrast coefficient.

One mode (parameter m) among the plurality of modes is set in the mode setting processor 32, so that the modified expanded-image data corresponding to the selected mode is generated. As the mode (=1, 2 and 3) is set in order, in the error calculating processor 36, the error is calculated in each mode. Then, in the contrast/mode determining processor 37, a mode making the error minimum is determined as an optimum mode, further, a corresponding contrast coefficient is determined as an optimum contrast coefficient. The optimum mode and the optimum contrast coefficient are recorded in a recording area M2 and a recording area M3 of a recording medium M, respectively. In the image expansion apparatus shown in FIG. 14, the reduced-image data, the optimum mode and the optimum contrast coefficient are read from the recording medium M, respectively. In the expanded-image generating processor 42, the fluency transform is executed in accordance with the optimum mode, thus the expanded-image data is obtained. Then, in the second contrast transform processor 43, the expanded-image data is subjected to the contrast transform by the optimum contrast coefficient, thus the modified expanded-image data corresponding to the original image data is generated.

In this way, the optimum contrast coefficient is determined in the image compression apparatus 30 in advance, so that the contrast transform according to the optimum contrast coefficient can be executed in the expansion processing.

Figure 15A:
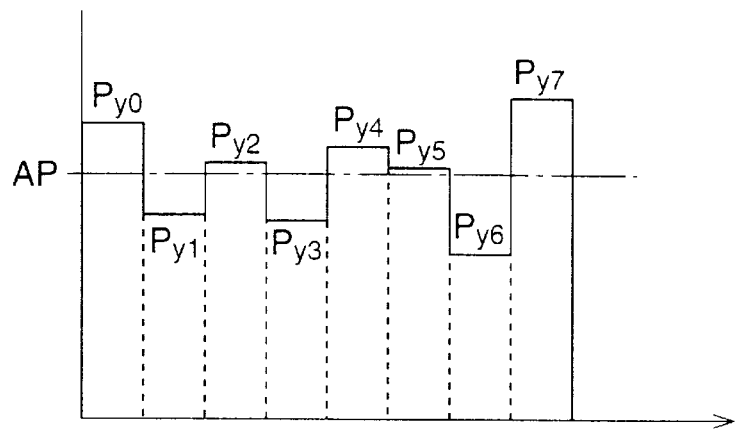
FIGS. 15A, 15B and 15C are views showing a contrast coefficient.
Figure 15B:
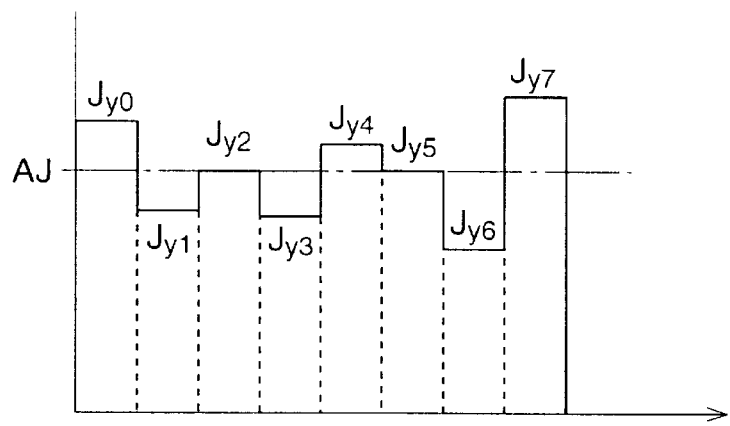
Figure 15C:
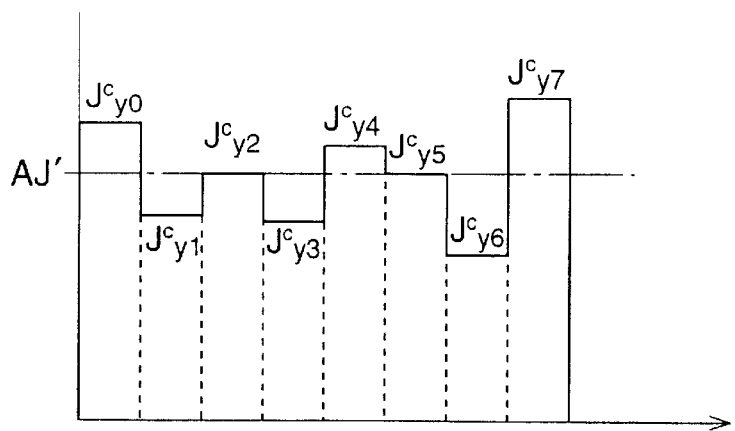

FIGS. 15A, 15B and 15C are views showing a contrast coefficient. With reference to FIGS. 3, 15A, 15B and 15C, the calculation of the contrast coefficient is explained below.

In a block B composed of 8×8 pixels, positioned at the origin in the original image data P, it is supposed that 8 pixels arranged in a horizontal line have values of $P_{y0}$, $P_{y1}$, $P_{y2}$, $P_{y3}$, $P_{y4}$, $P_{y5}$, $P_{y6}$ and $P_{y7}$ as shown in FIG. 15A, and 8 pixels of the expanded-image data J, corresponding to the 8 pixels of the original image data P, have values of $J_{y0}$, $J_{y1}$, $J_{y2}$, $J_{y3}$, $J_{y4}$, $J_{y5}$, $J_{y6}$ and $J_{y7}$ as shown in FIG. 15B. Further, it is supposed that the average value of the 8 pixel values of $P_{y0}$, $P_{y1}$, ... $P_{y7}$ of the original image data P is AP, and the average value of the 8 pixel values $J_{y0}$, $J_{y1}$, $J_{y2}$, ... $J_{y7}$ of the expanded-image data J is AJ.

A part of the data of the original image data P is lost because of processing in the reduced-image generating processor 31, so that each of the pixel values of the expanded-image data J has a different value to that of the original image data P. That is, each of the pixel values of the expanded-image data J is closer to the average value AJ in comparison with the original image data, as shown in FIGS. 15A, 15B, and thus the variations between each pixel value of the expanded-image data J are relatively small as a whole. In other words, a contrast of the expanded-image data J is lower than that of the original image data P.

Accordingly, in the contrast coefficient calculating processor 34, a contrast coefficient "con" is obtained as a modification coefficient, by which a contrast of the expanded-image data J approaches as close to that of the original image data J as possible. Then, 8 pixel values $J_{y0}$, $J_{y1}$, $J_{y2}$ ... $J_{y7}$ of the expanded-image data J are subjected to the contrast transform, using the contrast coefficient "con", so that modified pixel values $J^c_{y0}$, $J^c_{y1}$, $J^c_{y2}$, $J^c_{y3}$, $J^c_{y4}$, $J^c_{y5}$, $J^c_{y6}$, and $J^c_{y7}$ are obtained. Thus, a pixel of the expanded-image data J, which has a greater value than the average value AJ, is modified so as to have a further greater value, and a pixel of the expanded-image data J, which has a lesser value than the average value AJ, is modified so as to have a further less value, so that modified expanded-image data, in which the contrast is emphasized, is obtained.

Prior to the modification, each of the pixel values $J_{y0}$, $J_{y1}$, $J_{y2}$, ... $J_{y7}$ of the expanded-image data J is multiplied by a correction coefficient so that the average value AJ of the pixel values of the expanded-image data J becomes equal to the average value AP of the pixel values of the original image data P. For example, when the average AP is 1.05 times the average value AJ, each of the pixel values of the expanded-image data J is multiplied by 1.05 which is the correction coefficient, so that the pixel values of the expanded-image data J have an average value AJ' (=AP). That is, the average value AJ' of the pixel values $J^c_{y0}$, $J^c_{y1}$, $J^c_{y2}$, ... $J^c_{y7}$ (See FIG. 15C) of modified expanded-image data is equal to the average value AP of the original image data.

Herein, using the block B0' shown in FIG. 4, a calculation method of the contrast coefficient is explained.

An average value "ave" of 8×8 pixels in the block B0' is obtained by $$ave' = \frac{1}{64}\sum_{x=s\times 8}^{s\times 8+7}\sum_{y=t\times 8}^{t\times 8+7} J_{yx} \qquad (15)$$

Further, a corresponding average value "ave" of 8×8 pixels in the block B0 is obtained by $$ave = \frac{1}{64}\sum_{x=s\times 8}^{s\times 8+7}\sum_{y=t\times 8}^{t\times 8+7} J_{yx} \qquad (16)$$

The average value "ave" is equal to the pixel value R obtained by the formula (1).

Then, as described above, the pixel value $J_{yx}$, of the expanded-image data J is multiplied by the correction coefficient such that the average "ave" becomes equal to the average value "ave". Note that, in the following explanation, the values obtained by being multiplied by the correction coefficient are deemed as the pixel value $J_{yx}$. Therefore, the average value of the 8×8 pixels in the block B0' becomes equal to "ave" obtained by the formula (16).

The pixel values $J^c_{yx}$ of the modified expanded-image data are defined by $$J^c_{yx} = ave + (J_{yx} - ave) \times con \qquad (17)$$

That is, each of the pixel values $J^c_{yx}$ of the modified expanded-image data is obtained by adding the average value "ave" to a modified value "$(J_{yx}-ave) \times con$", which is the product of the correction coefficient "con" and the difference between the pixel value $J_{yx}$ and the average "ave".

By setting the contrast efficient "con" to the optimum value at the formula (17), modified expanded-image data, which has pixel values $j^c_{yx}$ closer to pixel values of the original image data P, can be obtained. Accordingly, the error function indicating the difference between the pixels $J_{YX}$ of the expanded-image data J and the pixels $P_{YX}$ of the original image data P is formulated as follows, and then a contrast coefficient, which makes the error function minimum, is found.

$$E'^{(s,t)} = \sum_{x=s\times 8}^{s\times 8+7} \sum_{y=t\times 8}^{t\times 8+7} (J^c_{yx} - P_{yx})^2 \qquad (18)$$

$$= \sum_{x=s\times 8}^{s\times 8+7} \sum_{y=t\times 8}^{t\times 8+7} ((ave + (J_{yx} - ave) \times con) - P_{yx})^2$$

As can be seen from the formula (18), the contrast error function $E'_{(s,t)}$ is defined as the sum of the square of the difference between each pixel p and corresponding pixel $P_{yx}$.

Considering that the contrast error function $E'_{(s,t)}$ is regarded as a evaluation function in which the contrast coefficient "con" is variable, a contrast coefficient, by which the contrast error function $E'_{(s,t)}$ becomes minimum, can be found. Namely, by partially differentiating formula (18) by the contrast coefficient contrast "con", and selecting the contrast coefficient "con" so as to have the value 0, the contrast error function $E'_{(s,t)}$ becomes a minimum value. In this case, the contrast coefficient "con", having the optimum value, is obtained on the basis of the following formulae (19), (20).

$$\frac{\partial E'^{(s,t)}}{\partial con} = -2 \sum_{x=s\times 8}^{s\times 8+7} \sum_{y=t\times 8}^{t\times 8+7} (P_{yx} - ave)(J_{yx} - ave) + \qquad (19)$$

$$2con \sum_{x=s\times 8}^{s\times 8+7} \sum_{y=t\times 8}^{t\times 8+7} (J_{yx} - ave)^2 = 0$$

$$\therefore con = \frac{\sum_{x=s\times 8}^{s\times 8+7} \sum_{y=t\times 8}^{t\times 8+7} (P_{yx} \times J_{yx}) - 64 \times ave^2}{\sum_{x=s\times 8}^{s\times 8+7} \sum_{y=t\times 8}^{t\times 8+7} (J_{yx})^2 - 64 \times ave^2} \qquad (20)$$

Regarding the other blocks B' in the expanded-image data J, a contrast coefficient "con" is calculated, similarly to the block B0'.

As shown in FIG. 13, after the contrast coefficient "con" is obtained in the contrast coefficient calculating processor 34, in the first contrast transform processor 35, the expanded-image data J is transformed to the modified expanded-image data. The contrast coefficient "con" is found in accordance with the mode set at the mode setting processor 32 in order, and then the modified expanded-image data is obtained in accordance with the selected mode. In the contrast/mode determining processor 37, parameter m, which makes the error function E' minimum, is determined as the optimum mode md, and the contrast coefficient "con" corresponding to the optimum mode md is determined as the optimum contrast coefficient "m con". The optimum contrast coefficient "m con" is recorded in the recording area M3.

Figure 16:
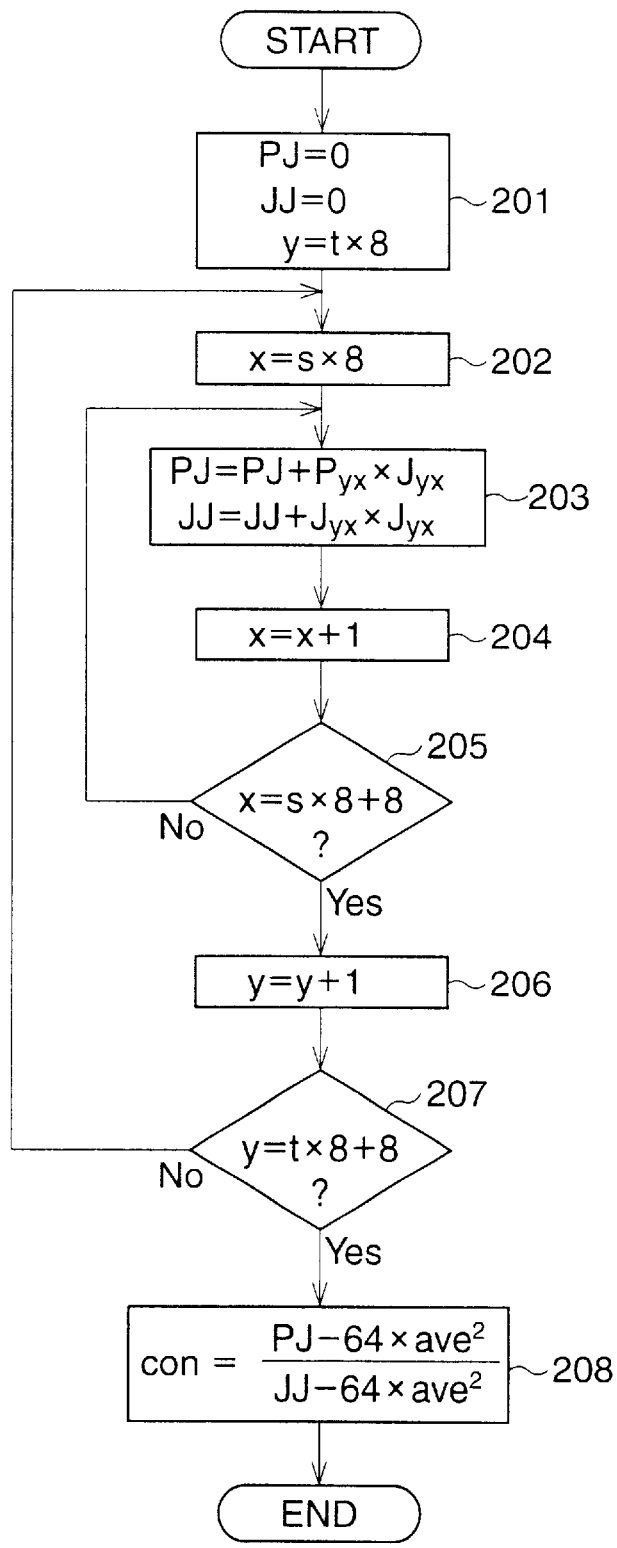
FIG. 16 is a view showing a flowchart of calculation processing of the contrast coefficient "con".

FIG. 16 is a view showing a flowchart calculation processing of the contrast coefficient "con", executed at the contrast coefficient calculating processor 34. Herein, the block B0' is a subject of the calculation.

In Step 201, an initial value of the product of a pixel value P, of the original image data P and a pixel value J of the expanded-image data J is set to 0, and an initial value of a square JJ of the pixel value $J_{yx}$ is set to 0. Note that, pixel values $J_{yx}$ of the expanded-image data are multiplied by the correction coefficient. Further, in Step 201, the y-coordinate regarding the blocks B0, B0' is set to an upper corner "(t×8)". In a similar way, in Step 202, the x-coordinate is set to a left corner "(s×8)".

In Step 203, the product of the pixel value J, of the expanded-image data J and the pixel value $P_{yx}$ of the original image data P is obtained, and is added to the product PJ which is obtained as the calculation result in the preceding execution of Step 203. Further, in Step 203, a square of the pixel $J_{yx}$ of the expanded-image data J is added to the product JJ which is obtained as the calculation result in the preceding execution of Step 203.

In Step 204, 1 is added to the x-coordinate of pixel, thus right neighboring pixel $J_{yx+1}$ becomes a subject of the calculation. In Step 205, it is determined whether the x-coordinate of the pixel is equal to a value, "(s×8)+8". Namely, it is determined whether the x-coordinate, set at Step 204, is not within the blocks B0, B0'. When it is determined that the x-coordinate of the pixel is equal to the value "(s×8)+8", the process goes to Step 206 so as to execute the calculation for next 8 pixels along the x-axis. On the other hand, when it is determined that the x-coordinate of the pixel is not equal to the value "(s×8)+8", the process returns to Step 203.

In Step 206, 1 is added to the y-coordinate of the pixel, and then in Step 207, it is determined whether the y-coordinate of the pixel is equal to a value "(t×8)+8". Namely, it is determined whether the calculation is executed for all pixels in the blocks B0, B0'. When it is determined that the y-coordinate of the pixel is equal to the value "(t×8)+8", the process goes to Step 208. On the other hand, when it is determined that the y-coordinate of the pixel is not equal to the value "(t×8)+8", the process returns to Step 202.

In Step 208, the contrast coefficient "con" is obtained by the formula (20). After the contrast coefficient "con" is obtained by the formula (20), this calculation processing of the contrast coefficient is terminated.

Figure 17:
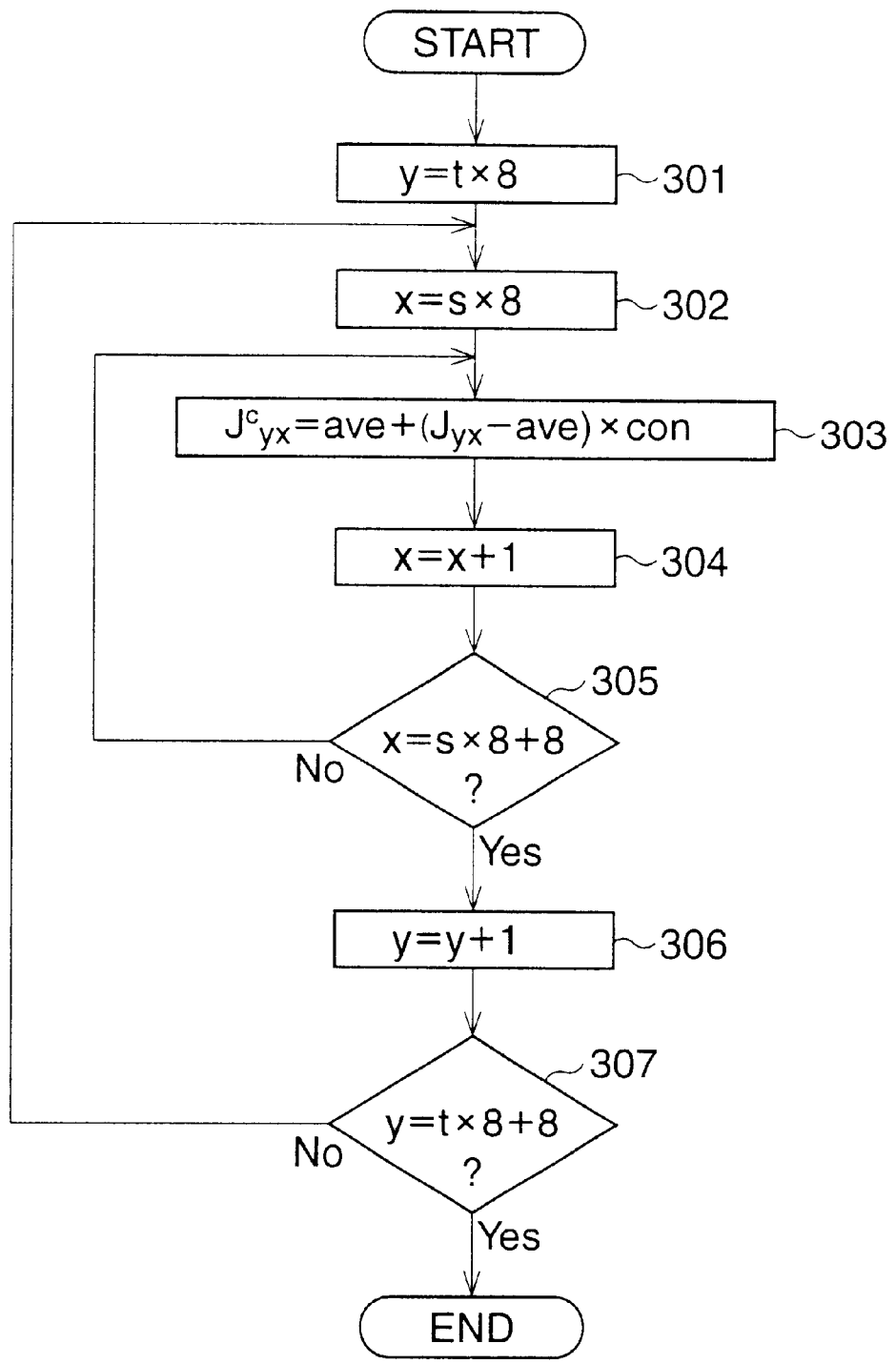
FIG. 17 is a view showing a flowchart of a contrast transform processing.

FIG. 17 is a view showing a flowchart of the contrast transform processing, executed at the first and second contrast transform processor 35, 43. Similarly to FIG. 16, the block B0' is a subject of the calculation.

In Step 301, the y-coordinate of a pixel regarding the block B0' is set to an upper corner "(t×8)". In Step 302, the x-coordinate of the pixel is set to a left corner "(s×8)". In Step 303, a pixel $J^c_{yx}$ of the modified expanded-image data is obtained on the basis of the formula (17). Note that, it is supposed that the contrast coefficient "con" is obtained at Step 208 in FIG. 16.

In Step 304, 1 is added to the x-coordinate of pixel, thus right neighboring pixel $J_{yx+1}$ becomes a subject of the calculation. In Step 305, it is determined whether the x-coordinate of the pixel is equal to a value "(s×8)+8". Namely, it is determined whether the x-coordinate, set at Step 204, is not within the block B0'. When it is determined that the x-coordinate of the pixel is equal to the value "(s×8)+8", the process goes to Step 306 so as to execute the calculation for the next 8 pixels along x-axis. On the other hand, when it is determined that the x-coordinate of the pixel is not equal to the value "(s×8)+8", the process returns to Step 303.

In Step 306, 1 is added to the y-coordinate of the pixel, and then in Step 307, it is determined whether the y-coordinate of the pixel is equal to a value "(t×8)+8". Namely, it is determined whether the calculation is executed for all pixels in the block B0'. When it is determined that the y-coordinate of the pixel is equal to the value "(t×8)+8", this process is terminated. On the other hand, when it is determined that the y-coordinate of the pixel is not equal to the value "(t×8)+8", the process returns to Step 302.

As described above, according to the second embodiment, the expanded-image data J is subjected to the contrast transform so that the modified expanded-image data is obtained. Thus, a pixel having a relatively high contrast is modified to a higher contrast pixel, and a pixel having a relatively low contrast is modified to a lower contrast pixel, so that an image data, which is closer to the original image data, can be obtained, compared with the first embodiment.

Note that, the fluency transform may be executed along the vertical direction and along the horizontal direction in order. Further, the original image data P may be expanded only along the horizontal (width) direction or the vertical (length) direction.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No.11-235955 (filed on Aug. 23, 1999) which is expressly incorporated herein, by reference, in its entirety.

What is claimed is:

1. A compression apparatus for compressing image data comprising:
   a reduced-image generating processor that transforms original image data partitioned into first blocks, each of which is composed of a plurality of pixels, to reduced-image data composed of a smaller number of pixels than that of said original image data;
   a fluency transform processor that applies a fluency transform to said reduced-image data to generate expanded-image data partitioned into second blocks corresponding to said first blocks, said fluency transform having a plurality of modes;
   a mode setting processor that selects one mode from said plurality of modes, said expanded-image data being generated in accordance with said selected one mode;
   an error calculating processor that calculates an error, which represents a difference between said original image data and said expanded-image data, said error calculating processor calculating said error in each of said plurality of modes; and
   an optimum mode determining processor that determines an optimum mode, by which said error becomes minimum, among said plurality of modes.

2. The compression apparatus according to claim 1, further comprising a recording medium, said reduced-image data and said optimum mode being recorded in said recording medium.

3. The compression apparatus according to claim 1, wherein each of said first blocks and each of said second blocks are composed of 8×8 (=64) pixels respectively.

4. The compression apparatus according to claim 1, wherein said reduced-image generating processor generates said reduced-image data composed of average pixels, obtained by finding an average value of said plurality of pixels in each of said first blocks.

5. The compression apparatus according to claim 1, wherein said fluency transform processor generates said expanded-image data by applying the fluency transform, which is expressed by the following formula, to each pixel of said reduced-image data:

$$f(t) = (1/2\pi) \int_{-\pi}^{\pi} F(u) \begin{bmatrix} m \\ o \end{bmatrix} \phi(t, u) du$$

note that, $$\begin{bmatrix} m \\ o \end{bmatrix} \phi(t, u) = (1/2\pi) \int_{-\infty}^{\infty} \left\{ \sum_{p=-\infty}^{\infty} \delta(\omega - u + 2\pi p) \right\} \times \left\{ \sum_{q=-\infty}^{\infty} (1 - q(2\pi/\omega))^{-2m} \right\}^{-1/2} \times \exp(i\omega t) d\omega$$

where F(u) corresponds to each pixel value of said reduced-image data, f(t) is a output values of the fluency transform, $\phi(t,u)$ is the fluency function defined by a fluency function space $^mS$, and m (=1,2,3, . . . ) is a parameter indicating a differentiability, said parameter m corresponding to said plurality of modes.

6. The compression apparatus according to claim 5, wherein said fluency transform processor applies the fluency transform in a state such that each pixel of said reduced-image data are arranged at a center position of each of said second blocks, and generates said expanded-image data composed of said plurality of pixels by adding said output values f(t) corresponding to pixel-positions in said second blocks.

7. The compression apparatus according to claim 6, wherein said plurality of pixels in said original image data is arranged in a matrix, and said fluency transform processor applies the fluency transform along a first direction to each pixel of said reduced-image data so that pixels aligned along said first direction are generated, and then applies the fluency transform to said pixels aligned along said first direction, along a second direction perpendicular to said first direction such that said plurality of pixels in each of said second blocks is generated.

8. The compression apparatus according to claim 1, wherein said error calculating processor calculates a difference between each pixel value of said first blocks and each corresponding pixel value of said second blocks, and calculates a sum total of the square of said difference as said error, said optimum mode determining processor setting a mode, which makes said error minimum, among said plurality of modes as said optimum mode.

9. The compression apparatus according to claim 1, wherein said optimum mode is determined in each of said second blocks.

10. An expansion apparatus for expanding said reduced-image data recorded in said recording medium by said compression apparatus in claim 2, said expansion apparatus comprising:

a data reading processor that reads said reduced-image data and said optimum mode recorded in said recording medium;

an optimum mode setting processor that sets said optimum mode among said plurality of modes; and an expanded-image generating processor that applies said fluency transform based on said optimum mode to said reduced-image data such that expanded-image data corresponding to said original image data is obtained.

11. A compression method for compressing image data comprising:

transforming original image data partitioned into first blocks, each of which is composed of a plurality of pixels, to reduced-image data composed of a smaller number of pixels than that of the original image data;

applying a fluency transform to the reduced-image data to generate expanded-image data partitioned into second blocks corresponding to the first blocks, the fluency transform having a plurality of modes;

selecting one mode from the plurality of modes, the expanded-image data being generated in accordance with the selected one mode;

calculating an error in each of the plurality of modes, the error representing, a difference between the original image data and the expanded-image data;

determining an optimum mode, by which the error becomes minimum, among the plurality of modes; and recording the reduced-image data and the optimum mode in a recording medium.

12. An expansion method for expanding said reduced-image data obtained by said compression method in claim 11, said expansion method comprising:

reading the reduced-image data and the optimum mode from the recording medium;

setting the optimum mode among the plurality of modes; and applying the fluency transform based on said optimum mode to the reduced-image data such that expanded-image data corresponding to the original image data is obtained.

13. A memory medium that stores a program for compressing image data, the program comprising:

transforming original image data partitioned into first blocks, each of which is composed of a plurality of pixels, to reduced-image data composed of a smaller number of pixels than that of the original image data;

applying a fluency transform to the reduced-image data to generate expanded-image data partitioned into second blocks corresponding to the first blocks, the fluency transform having a plurality of modes;

selecting one mode from the plurality of modes, the expanded-image data being generated in accordance with the selected one mode;

calculating an error in each of the plurality of modes, the error representing, a difference between the original image data and the expanded-image data;

determining an optimum mode, by which the error becomes minimum, among the plurality of modes; and recording the reduced-image data and the optimum mode in a recording medium.

14. A memory medium that stores a program for expanding said reduced-image data described in claim 13, comprising:

reading the reduced-image data and the optimum mode from the recording medium;

setting the optimum mode among the plurality of modes; and applying the fluency transform based on the optimum mode to the reduced-imaged data such that expanded image data corresponding to the original image data is obtained.

15. A compression apparatus for compressing image data comprising:

a reduced-image generating processor that transforms original image data partitioned into first blocks, each of which is composed of a plurality of pixels, to reduced-image data composed of a smaller number of pixels than that of said original image data;

a fluency transform processor that applies a fluency transform to said reduced-image data to generate expanded-image data partitioned into second blocks corresponding to said first blocks, said fluency transform having a plurality of modes;

a contrast coefficient calculating processor that obtains a contrast coefficient in such a manner that a contrast of said expanded-image data becomes close to a contrast of said original image data by applying said contrast coefficient to said expanded-image data;

a contrast transform processor that applies said contrast coefficient to said expanded-image data to modify the contrast of said expanded-image data so that modified expanded-image data is obtained;

a mode setting processor that selects one mode from said plurality of modes, said modified expanded-image data being generated in accordance with said selected one mode;

an error calculating processor that calculates an error, which represents a difference between said original image data and said modified expanded-image data, said error calculating processor calculating in each of said plurality of modes; and an optimum mode/contrast determining processor that determines an optimum mode, by which said error becomes minimum, among said plurality of modes, and then sets a contrast coefficient corresponding to said optimum mode as an optimum contrast coefficient.

16. The compression apparatus according to claim 15, wherein said contrast transform modifies said expanded-image data such that a pixel having a relatively high contrast in said expanded-image data is modified to a higher contrast pixel, and a pixel having a relatively low contrast in said expanded-image data is modified to a lower contrast pixel.

17. The compression apparatus according to claim 15, wherein said contrast coefficient calculating processor obtains said contrast coefficient, which makes a sum of the square of the difference between each pixel value of said original image data and each corresponding pixel value of said modified expanded-image data.

18. The compression apparatus according to claim 15, further comprising a recording medium, said optimum contrast coefficient and said optimum mode, said reduced-image data, said optimum contrast coefficient and said optimum mode being recorded in said recording medium.

19. An expansion apparatus for expanding said reduced-image data recorded in said recording medium by said compression apparatus for compressing the image data in claim 18, said expansion apparatus comprising:

a data reading processor that reads said reduced-image data, said optimum contrast coefficient and said optimum mode recorded in said recording medium;

an optimum mode setting processor that sets said optimum mode among said plurality of modes;

an expanded-image generating processor that applies said fluency transform according to said optimum mode to said reduced-image data such that expanded-image data corresponding to said original image data is obtained; and a contrast modifying processor that applies said contrast transform based on said optimum contrast coefficient to said expanded-image data, to obtain modified expanded-image data.

* * * * *